United States Patent
Motooka et al.

(10) Patent No.: US 11,789,162 B2
(45) Date of Patent: Oct. 17, 2023

(54) POSITIONING APPARATUS AND AUGMENTATION INFORMATION GENERATION APPARATUS

(71) Applicant: Mitsubishi Electric Corporation, Tokyo (JP)

(72) Inventors: Norizumi Motooka, Tokyo (JP); Yuki Sato, Tokyo (JP); Takamasa Kawaguchi, Tokyo (JP); Yuichi Hagito, Tokyo (JP); Masayasu Fujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 43 days.

(21) Appl. No.: 17/770,637

(22) PCT Filed: Oct. 16, 2020

(86) PCT No.: PCT/JP2020/039186
§ 371 (c)(1),
(2) Date: Apr. 21, 2022

(87) PCT Pub. No.: WO2021/117342
PCT Pub. Date: Jun. 17, 2021

(65) Prior Publication Data
US 2022/0381924 A1    Dec. 1, 2022

(30) Foreign Application Priority Data
Dec. 12, 2019 (JP) ................................. 2019-224845

(51) Int. Cl.
*G01S 19/32* (2010.01)
*G01S 19/39* (2010.01)
(Continued)

(52) U.S. Cl.
CPC ............. *G01S 19/396* (2019.08); *G01S 19/11* (2013.01)

(58) Field of Classification Search
CPC .......... G01S 19/32; G01S 19/33; G01S 19/44; G01C 21/28; G01C 21/36
See application file for complete search history.

(56) References Cited

U.S. PATENT DOCUMENTS 10,481,272 B2 * 11/2019 Hanika-Heidl ......... G01S 19/05
11,067,699 B2 *  7/2021 Stählin .................... G01S 19/40
(Continued)

FOREIGN PATENT DOCUMENTS

AU      2011360286 B2     5/2015
JP      2018-100874 A     6/2018
(Continued)

OTHER PUBLICATIONS

International Search Report and Written Opinion dated Dec. 28, 2020, received for PCT Application PCT/JP2020/039186, Filed on Oct. 16, 2020, 9 pages including English Translation.
(Continued)

Primary Examiner — Tan Q Nguyen
(74) Attorney, Agent, or Firm — XSENSUS LLP

(57) ABSTRACT

A first bias conversion unit converts, based on a first frequency and a second frequency, a signal bias related to carrier phase for correcting a carrier phase contained in a first ranging signal having the first frequency, to a signal bias related to carrier phase for correcting a carrier phase contained in a second ranging signal having the second frequency. A first correction unit corrects the carrier phase using the converted signal bias. A second bias conversion unit converts the signal bias related to pseudorange to the signal bias related to pseudorange by making reference to a conversion table indicating values for use in conversion of
(Continued)

the signal bias related to pseudorange to the signal bias related to pseudorange. A second correction unit corrects a pseudorange using the converted signal bias.

14 Claims, 16 Drawing Sheets

(51) Int. Cl.
*G01S 19/11* (2010.01)
*G01C 21/28* (2006.01)

(56) References Cited

U.S. PATENT DOCUMENTS

| | | |
|---|---|---|
| 2017/0090038 A1 | 3/2017 | Saito et al. |
| 2017/0123072 A1 | 5/2017 | Miya et al. |
| 2019/0317224 A1 | 10/2019 | Miya et al. |

FOREIGN PATENT DOCUMENTS

| | | |
|---|---|---|
| WO | 2012/114620 A1 | 8/2012 |
| WO | 2015/145719 A1 | 10/2015 |
| WO | 2015/194061 A1 | 12/2015 |
| WO | 2018/078795 A1 | 5/2018 |

OTHER PUBLICATIONS

Sleewaegen et al., "Galileo E5b Rover Receiving E5a Corrections? No Problem!", ION GNSS 2019, 10 pages.

* cited by examiner

Fig. 4

41: CONVERSION TABLE

| SATELLITE NUMBER | SIGNAL TYPE BEFORE CONVERSION | SIGNAL TYPE AFTER CONVERSION | CONVERSION VALUE $\Delta p$ [m] |
|---|---|---|---|
| E01 | E5a | E5b | 0.15 |
| E02 | E5a | E5b | 0.23 |
| E03 | E5a | E5b | 0.09 |
| E04 | E5a | E5b | 0.60 |
| E05 | E5a | E5b | 0.01 |
| ... | ... | ... | ... |

Fig. 9

| Satellite System | Frequency Bands |
|---|---|
| Galileo | E1 (1575.42MHz),<br>E6 (1278.75MHz),<br>E5a (1176.45MHz),<br>E5b (1207.14MHz),<br>E5altboc (E5) (1191.795MHz). |
| BeiDou-3 | B1C (1575.42MHz),<br>B1I (1561.098MHz),<br>B3 (1268.52MHz),<br>B2a (1176.45MHz). |
| GPS | L1 (1575.42MHz),<br>L2 (1227.6MHz),<br>L5 (1176.45MHz). |
| GLONASS | G1 (TO 1602MHz),<br>G2 (TO 1246MHz),<br>L3 (1202.025MHz). |

SIGNALS THAT CAN BE CONVERTED → {E5a, E5b, E5altboc} All the E5 signals are generated as a single wide-band modulation in the satellites.

SIGNALS THAT CAN BE CONVERTED → {B1C, B1I}

POSITIONING APPARATUS AND AUGMENTATION INFORMATION GENERATION APPARATUS

CROSS-REFERENCE TO RELATED APPLICATIONS

The present application is based on PCT filing PCT/JP2020/039186, filed Oct. 16, 2020, which claims priority to Japanese Application No. 2019-224845, filed on Dec. 12, 2019, the entire contents of each are incorporated herein by reference.

TECHNICAL FIELD

The present disclosure relates to a positioning apparatus to perform positioning using positioning augmentation information and an augmentation information generation apparatus to generate positioning augmentation information.

BACKGROUND ART

For satellite positioning, there is a positioning technique of obtaining an accurate positioning solution by correcting errors contained in a ranging signal transmitted by a positioning satellite by means of positioning augmentation information (hereinafter denoted as augmentation information) and solving an integer value bias which is uncertainty of carrier phase. Augmentation information as error information is provided as a quantity of state corresponding to each error factor, and techniques for independently performing accurate positioning using error information include PPP-AR (Precise Point Positioning Ambiguity Resolution) and PPP-RTK (Precise Point Positioning Real-Time Kinematic). In the PPP-AR positioning approach, a positioning apparatus of a user acquires information on satellite orbit error, satellite clock error, and satellite signal bias, and corrects errors contained in ranging signals. Since satellite signal bias as error information differs from signal type to signal type, such as L1C/A, L2P, and L2C, they are provided to the positioning apparatus of the user for each signal type.

In the PPP-AR, for tropospheric delay and ionospheric delay, correction with a model is performed or they are estimated and removed by an estimation filter such as a Kalman filter. In the PPP-RTK positioning approach, error information related to tropospheric delay and ionospheric delay is provided in addition to satellite orbit error, satellite clock error, and satellite signal bias, and the positioning apparatus of the user can correct errors contained in ranging signals from such error information (Patent Literature 1, for instance).

Augmentation information includes error information that is different from one ranging signal to another; only when the signal type of a ranging signal received by the positioning apparatus of the user matches the signal type of error information contained in augmentation information, errors contained in the ranging signal can be corrected with the error information contained in the augmentation information.

In other words, some of multiple pieces of error information contained in augmentation information cannot be used for correction of errors contained in a ranging signal unless they match the signal type of the ranging signal, and error information could be unusable for correction of errors contained in a ranging signal depending on difference in signal type.

CITATION LIST

Patent Literature

Patent Literature 1: WO 2015/145719 pamphlet

SUMMARY OF INVENTION

Technical Problem

As mentioned above, when the signal type of a ranging signal and the signal type of error information do not match, error correction cannot be performed on the ranging signal and thus the ranging signal cannot be used in positioning calculation, which leads to an issue of lowered positioning accuracy.

The present disclosure aims to provide apparatuses for converting error information to error information of a usable signal type when the signal type of a ranging signal and the signal type of the error information do not match.

Solution to Problem

A positioning apparatus to process a first ranging signal having a first frequency and a second ranging signal having a second frequency which are transmitted from a plurality of positioning satellites, the positioning apparatus according to the present invention includes a conversion unit to convert first augmentation information for correcting first calculation information for position calculation contained in the first ranging signal to second augmentation information for correcting second calculation information for position calculation contained in the second ranging signal; and a correction unit to correct the second calculation information using the second augmentation information.

Advantageous Effects of Invention

As the present disclosure enables error correction on a ranging signal when the signal type of the ranging signal and the signal type of error information do not match, use of the ranging signal in positioning calculation becomes possible and reduction in positioning accuracy can be suppressed.

BRIEF DESCRIPTION OF DRAWINGS

FIG. 4 is a diagram of Embodiment 1 showing a conversion table 41.

FIG. 9 is a diagram of Embodiment 1 showing pieces of augmentation information that can be converted mutually.

DESCRIPTION OF EMBODIMENTS

Embodiment 1

A positioning apparatus 101 in Embodiment 1 is described below with reference to drawings.

The positioning apparatus 101 performs positioning using the PPP-RTK positioning approach. A feature of the positioning apparatus 101 is that it has a function of converting error information to a signal type that is applicable to a ranging signal in question when the signal type of a ranging signal transmitted by a positioning satellite does not match the signal type of error information contained in augmentation information, like a signal bias related to pseudorange or a signal bias related to carrier phase, and the error information cannot be applied to the ranging signal.

Figure 1:
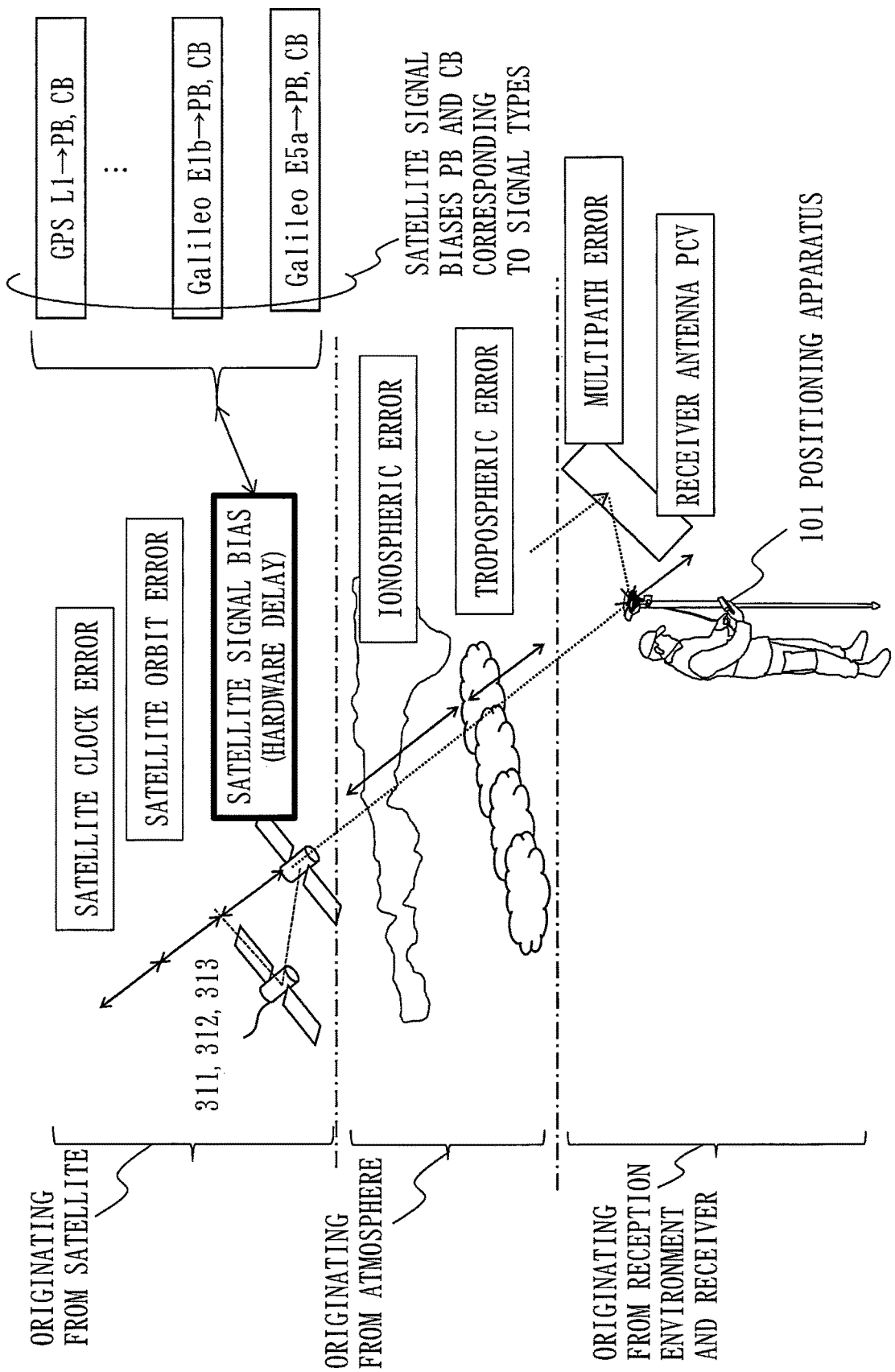
FIG. 1 is a diagram of Embodiment 1 illustrating error factors in positioning using ranging signals.

FIG. 1 is a diagram illustrating error factors in positioning using ranging signals. Ranging signals transmitted by positioning satellites that constitute a GNSS (Global Navigation Satellite System), such as a GPS satellite 311, a Galileo satellite 312, and a quasi-zenith satellite 313, have orbit error, satellite clock error, and satellite signal bias as errors originating from positioning satellites. In the embodiments below, satellite signal bias will be divided into signal bias related to pseudorange and signal bias related to carrier phase in description. Signal bias related to pseudorange is denoted as CB and signal bias related to carrier phase is denoted as PB. In FIG. 1, the signal bias CB related to pseudorange and the signal bias PB related to carrier phase are shown with a ranging signal L1 of the GPS satellite 311 and a ranging signal E1b of the Galileo satellite 312.

Errors originating from a propagation channel of a ranging signal include ionospheric propagation delay error and tropospheric propagation delay error (hereinafter denoted as ionospheric error and tropospheric error). Errors originating from a reception circuit of the positioning apparatus 101 include receiver clock error, receiver noise, and also multipath caused by interference between a ranging signal reflected on a building and a ranging signal received directly from a positioning satellite.

When positioning is performed using augmentation information provided in a state space representation (SSR), error correction cannot be performed on a ranging signal that does not match the signal type of a satellite signal bias contained in augmentation information, so that the ranging signal cannot be used in positioning calculation.

Figure 2:
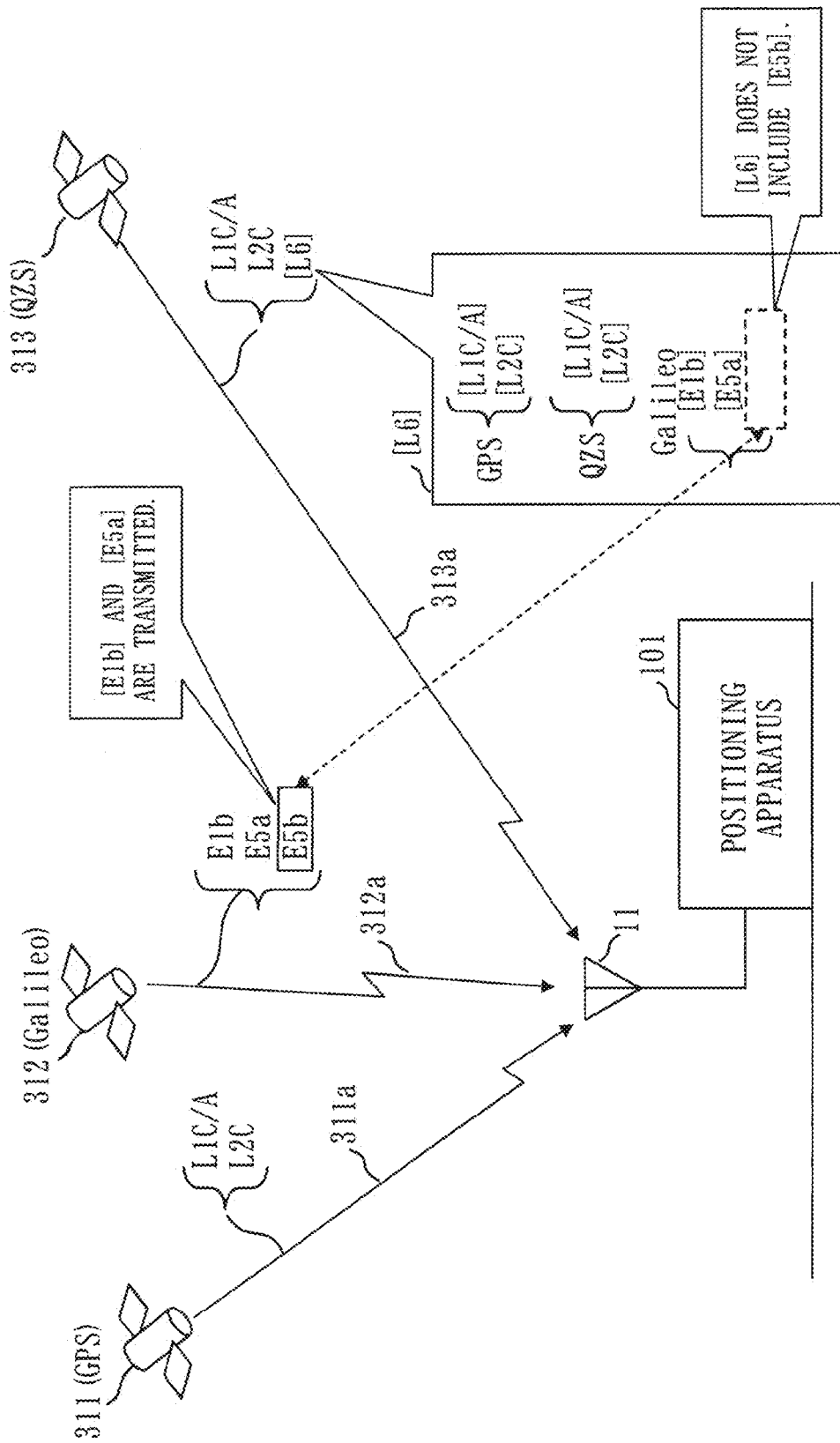
FIG. 2 is a diagram of Embodiment 1 explaining that augmentation information cannot be used with a ranging signal of a different signal type.

FIG. 2 is a diagram explaining that augmentation information cannot be used with a ranging signal of a different signal type. FIG. 2 shows the following. The GPS satellite 311 transmits a transmission signal 311a.

The transmission signal 311a includes ranging signals L1C/A and L2C, which are of multiple signal types with different frequencies. The Galileo satellite 312 transmits a transmission signal 312a. The transmission signal 312a includes ranging signals E1b, E5a, and E5b, which are of multiple signal types with different frequencies. The quasi-zenith satellite 313 transmits a transmission signal 313a. The transmission signal 313a includes ranging signals L1C/A and L2C, which are of multiple signal types with different frequencies, and augmentation information [L6]. The symbol [ ] indicates being error information. The augmentation information [L6] may be information adherent to SSR compression format (Compact SSR) corresponding to the PPP-RTK positioning, capable of positioning on the order of centimeters, as a state space representation.

For the GPS satellite 311, the augmentation information [L6] includes error information [L1C/A] and error information [L2C] respectively compatible with the respective signal types of ranging signals. For the quasi-zenith satellite 313, the augmentation information [L6] includes error information [L1C/A] and error information [L2C] respectively compatible with the respective signal types of ranging signals. For the Galileo satellite 312, the augmentation information [L6] includes error information [E1b] and [E5a] respectively compatible with the respective signal types of the ranging signals E1b and E5a. However, the augmentation information [L6] does not include error information [E5b] compatible with the signal type of the ranging signal E5b.

The positioning apparatus 101 accordingly converts the error information [E5a] of a signal type not compatible with the ranging signal E5b to error information [E5b] compatible with the ranging signal E5b. The positioning apparatus 101 uses the error information [E5b] converted from the error information [E5a] to correct errors contained in the ranging signal E5b.

Figure 3:
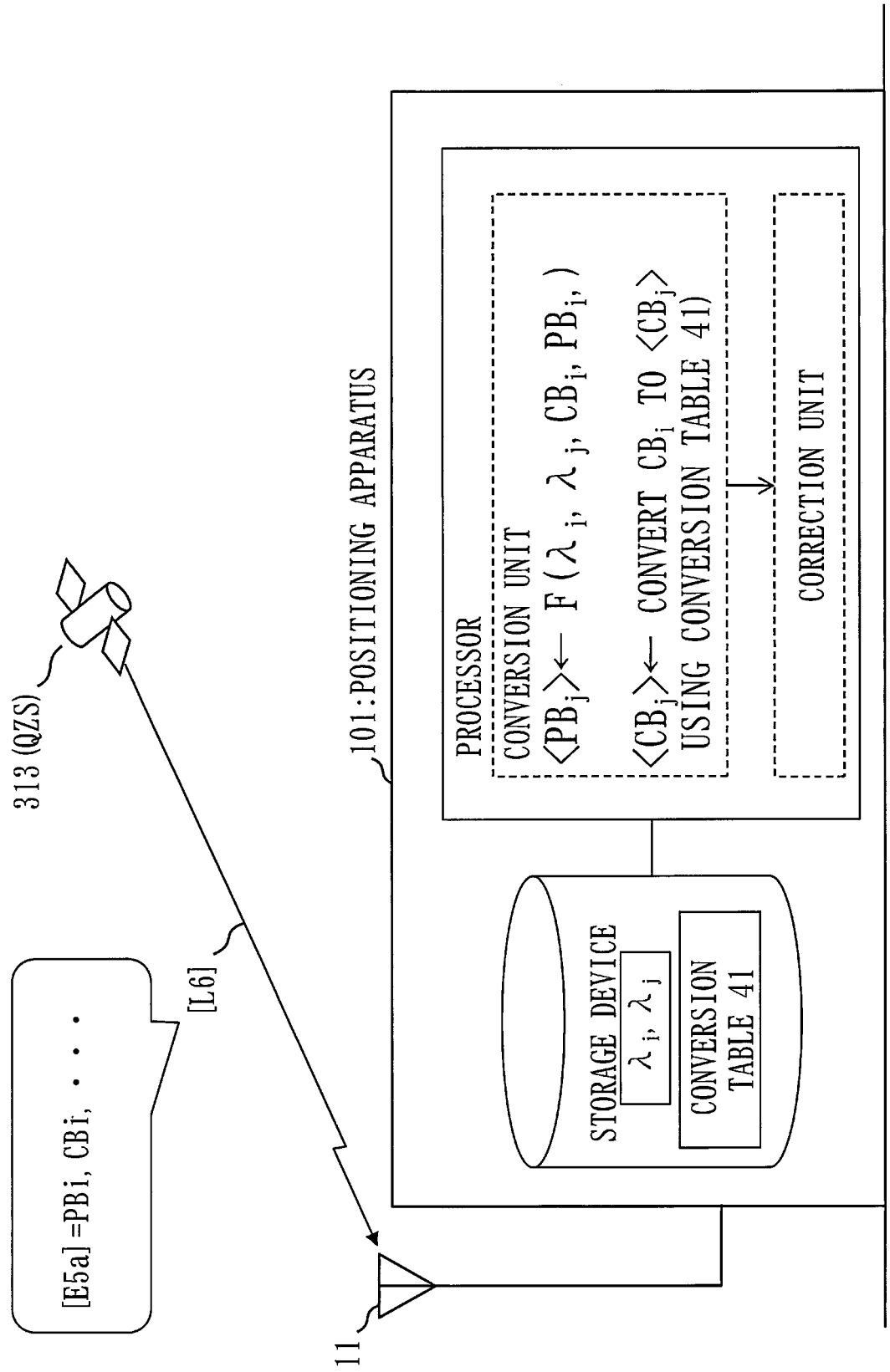
FIG. 3 is a diagram of Embodiment 1 showing features of a positioning apparatus 101.

FIG. 3 shows features of the positioning apparatus 101. With reference to FIG. 3, conversion of the error information [E5a] to the error information [E5b] by the positioning apparatus 101 is described. The error information is the signal bias PB related to carrier phase and the signal bias CB related to pseudorange. Error information before conversion is indicated by the suffix "i" and error information after conversion is indicated by the suffix "j". That is, error information before conversion is a signal bias $PB_i$ related to carrier phase and a signal bias $CB_i$ related to pseudorange, and error information after conversion is a signal bias $PB_j$ related to carrier phase and a signal bias $CB_j$ related to pseudorange. In the following, the signal bias $PB_j$ related to carrier phase and signal bias $C_j$ related to pseudorange may be denoted as signal bias $PB_j$ and signal bias $CB_j$. As shown in FIG. 3, the quasi-zenith satellite 313 is transmitting augmentation information [L6] including error information [E5a].

(1) The error information [E5a] contains the signal bias $PB_i$ related to carrier phase and the signal bias $CB_i$ related to pseudorange.

(2) The positioning apparatus 101 has stored a wavelength $\lambda_i$ of the ranging signal E5a and a wavelength $\lambda_j$ of the ranging signal E5b in a storage device.

(3) The positioning apparatus 101 has stored a conversion table 41 for converting the signal bias $CB_i$ related to pseudorange to the signal bias $CB_j$ related to pseudorange in the storage device.

(4) For the signal bias $PB_j$ elated to carrier phase, the positioning apparatus 101 converts the signal bias $PB_i$ to the signal bias $PB_j$ using a conversion formula $F(\lambda_i, \lambda_j, CB_i, PB_i)$.

(5) For the signal bias $CB_j$ related to pseudorange, it converts the signal bias $CB_i$ to the signal bias $CB_j$ using a value from the conversion table 41.

<Conversion formula F>

The way of computing the conversion formula $F(\lambda_i, \lambda_j, \lambda_j, CB_i, PB_i)$ is described. The expression (1) below shows the conversion formula $F(\lambda_i, \lambda_j, C_i, PB_i)$ specifically. In expression (1), the signal bias $\overline{PB_j}$ after conversion is denoted as $PB_j$ bar, with a line above. The signal bias $PB_i$ is error information for the ranging signal E5a and the signal bias $PB_j$ is error information for the ranging signal E5b.

FORMULA 1

$$\overline{PB_j} = \lambda_j \left\{ \left( \frac{1}{\lambda_j} - \frac{1}{\lambda_i} \right) CB_i + \frac{PB_i}{\lambda_i} \right\} \quad (1)$$

$PB_i$: carrier phase signal bias for frequency fi [m]

CB: signal bias related to pseudorange [m]

$\overline{PB_j}$: carrier phase signal bias for frequency fj converted from carrier phase signal bias for frequency fi [m]

$\lambda_i/\lambda_j$: wavelengths of frequencies fi and fj [m]

Expressions (2) to (5) below are observation equations relating to ranging signals of the frequency $f_i$ and the frequency $f_j$. A ranging signal of the frequency $f_i$ corresponds to the ranging signal E5a of the Galileo satellite 312. A ranging signal of the frequency $f_j$ corresponds to the ranging signal E5b of the Galileo satellite 312.

FORMULA 2

$$\begin{cases} P_i = \rho + I_i + \delta P_i & (2) \\ P_j = \rho + \frac{f_i^2}{f_j^2} I_i + \delta P_j & (3) \\ \varphi_i = \frac{f_i}{c} \rho - \frac{f_i}{c} I_i + N_i + \delta \varphi_i & (4) \\ \varphi_j = \frac{f_j}{c} \rho - \frac{f_j}{c} \frac{f_i^2}{f_j^2} I_i + N_j + \delta \varphi_j & (5) \end{cases}$$

P: pseudorange (the distance measured between the satellite and the antenna) [m]

$\rho$: geometric distance (the true distance between the satellite and the antenna) [m]

I: ionospheric delay [m]

$\delta P$: pseudorange bias [m]

$\varphi$: carrier phase [cycle]

f: frequency [Hz]

c: the speed of light [m/s]

N: integer value bias (the uncertainty of the carrier phase) [cycle]

$\delta\varphi$: carrier phase bias [cycle]

Eliminating the geometric distance $\rho$ through expressions (2) to (5) yields expressions (6) and (7):

FORMULA 3

$$\begin{cases} \varphi_j = \varphi_i + \frac{f_j - f_i}{c} P_i - \frac{(f_j - f_i)^2}{c f_j} I_i + \\ \quad (N_j - N_i) + \boxed{(\delta\varphi_j - \delta\varphi_i) - \frac{f_j - f_i}{c} \delta P_i} & (6) \\ P_j = P_i + \left( \frac{f_i^2}{f_j^2} - 1 \right) I_i + \boxed{(\delta P_j - \delta P_i)} & (7) \end{cases}$$

The portion enclosed by a broken line in expression (6) is known to take a particular value regardless of satellite and time. It can also be freely set at any value because it will be canceled at a position calculation unit 29a, discussed later. Thus, it is assumed as zero here. The expression enclosed by a broken line in expression (7), "$\delta P_j - \delta P_i$", is also known to take a particular value regardless of time. Thus, the portion enclosed by a broken line in expression (6) can be denoted as expression (8-1). In expression (8-1), Const=0 holds. Expression (8-1) is further turned into expression (8-2). The portion enclosed by a broken line in expression (7) can be denoted as expression (9-1) and further as expression (9-2).

FORMULA 4

$$(\delta\varphi_j - \delta\varphi_i) - \frac{f_j - f_i}{c} \delta P_i = Const \quad (8\text{--}1)$$

$$\frac{\widehat{PB}_j}{\lambda_j} = \frac{f_j - f_i}{c} CB_i + \frac{PB_i}{\lambda_i} + Const \quad (8\text{--}2)$$

$$\delta P_j - \delta P_i = Const, \quad (9\text{--}1)$$

$$\widehat{CB}_j = CB_i + Const \quad (9\text{--}2)$$

$\delta\varphi$ and $\delta P$ are read as Phase Bias and Code bias for a CLAS correction amount.

$$\delta\varphi_j \rightarrow \frac{PB_j}{\lambda_j}, \quad (10\text{--}1)$$

$$\delta P_j \rightarrow CB_j \quad (10\text{--}2)$$

For the ranging signal of a frequency $f_k$, $\delta\varphi_k \times \lambda_k = PB_k$ and $\delta P_k = CB_k$ hold. That is, using expressions (10-1) and (10-2) above, expressions (8-2) and (9-2) can be derived. In expression (8-2), setting Const=0 can yield expression (1). In expression (8-2), for the speed of light c, $c = f\lambda$ and $c = f_i \times \lambda_i = f_j \times \lambda_j$ hold. The $PB_j$ hat in expression (8-2) is the $PB_j$ bar in expression (1).

For expression (9-2), by setting Const=$\Delta p$, it can be denoted as expression (11):

FORMULA 5

$$\overline{CB_j} = CB_i + \Delta p \quad (11)$$

$CB_i$: pseudorange signal bias for frequency fi [m]

$\overline{CB_j}$: pseudorange signal bias for frequency fj converted from pseudorange signal bias for frequency fi [m]

<Conversion Table 41>

FIG. 4 shows the conversion table 41. As discussed later, a second bias conversion unit 27 of the positioning apparatus 101 converts $CB_i$ to $CB_j$ by making reference to the conversion table 41. The conversion table 41 is described. For the signal bias CB related to pseudorange, a conversion value $\Delta p$ for use in conversion is prepared on a per-satellite basis because the signal bias CB related to pseudorange has small variations with time. The second bias conversion unit 27 reads Δp and converts $CB_i$ to $CB_j$ according to expression 11. The satellite number in the conversion table 41 is indicative of the type of the Galileo satellite 312. Signal type before conversion refers to the pseudorange signal bias $CB_i$ before conversion. Signal type after conversion refers to the pseudorange signal bias $CB_j$ after conversion. The conversion value Δp is Δp in expression (11).

As mentioned in the description of FIG. 3, a conversion unit converts first augmentation information $PB_i$ for correcting the carrier phase, which is first calculation information for position calculation contained in a first ranging signal E5a having a first frequency, to second augmentation information PBj for correcting the carrier phase, which is second calculation information for position calculation contained in a second ranging signal E5b having a second frequency, based on a first wavelength $\lambda_i$ and a second wavelength $\lambda_j$, as shown in expression (1). A first correction unit 28, discussed later, corrects $\varphi_j$, or the second calculation information, according to expression (13) discussed later using the second augmentation information $PB_j$ converted from the first augmentation information $PB_i$.

For expression (1), the first calculation information is the carrier phase contained in the first ranging signal E5a as shown above. The second calculation information is the carrier phase contained in the second ranging signal E5b.

The first augmentation information is a signal bias for correcting the carrier phase contained in the first ranging signal E5a. The second augmentation information is a signal bias for correcting the carrier phase contained in the second ranging signal E5b. A first bias conversion unit 26, discussed later, converts the first augmentation information $PB_i$ to the second augmentation information $PB_j$ based on an expression of linear combination of the signal bias $PB_i$ related to carrier phase as the first augmentation information contained in the first ranging signal E5a and the signal bias $CB_i$ related to pseudorange as information for correcting a pseudorange contained in the first ranging signal E5a, as shown in expression (1).

Conversion of the signal bias $CB_i$ related to pseudorange using the conversion table 41 of FIG. 4 is done in the following manner. As mentioned in the description of FIG. 4, the conversion unit converts the first augmentation information $CB_i$ for correcting a pseudorange, which is the first calculation information for position calculation contained in the first ranging signal E5a having the first frequency, to the second augmentation information $CB_j$ for correcting a pseudorange, which is the second calculation information for position calculation contained in the second ranging signal E5b having the second frequency, based on a first wavelength $\lambda_i$, and a second wavelength $\lambda_j$, as shown in expression (11). A second correction unit 29, discussed later, corrects $P_j$, or the second calculation information, according to expression (12) discussed later using the second augmentation information $CB_j$ converted from the first augmentation information $CB_i$.

For expression (11), the first calculation information is the pseudorange contained in the first ranging signal E5a as shown above. The second calculation information is the pseudorange contained in the second ranging signal E5b. The first augmentation information is the signal bias $CB_i$ for correcting the pseudorange contained in the first ranging signal E5a. The second augmentation information is the signal bias $CB_j$ for correcting the pseudorange contained in the second ranging signal E5b. The second bias conversion unit 27 converts the first augmentation information $CB_i$ to the second augmentation information $CB_j$ by making reference to the conversion table 41, which is conversion information indicating values Δp for use in conversion to the second augmentation information $CB_j$, as mentioned in the description of FIG. 4.

Description of Configuration

Figure 5:
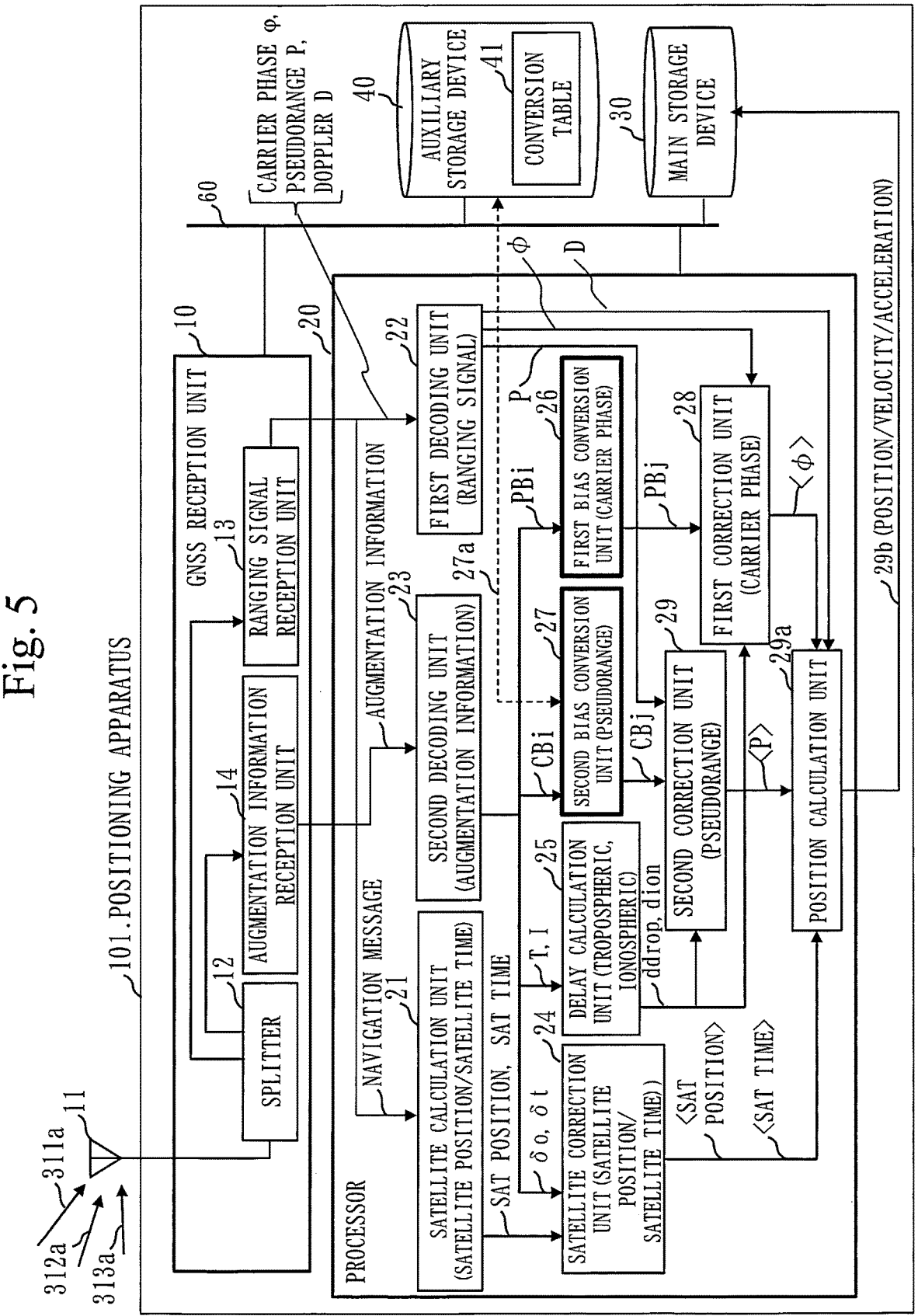
FIG. 5 is a diagram of Embodiment 1 and is a hardware configuration diagram of the positioning apparatus 101.

FIG. 5 is a hardware configuration diagram of the positioning apparatus 101. The positioning apparatus 101 includes a GNSS reception unit 10, a processor 20, a main storage device 30, and an auxiliary storage device 40 as hardware. The pieces of hardware are connected by a signal line 60.

The GNSS reception unit 10 includes an antenna 11, a splitter 12, a ranging signal reception unit 13, and an augmentation information reception unit 14. The antenna 11 receives the transmission signal 311a, the transmission signal 312a, and the transmission signal 313a from the GPS satellite 311, the Galileo satellite 312, and the quasi-zenith satellite 313. The splitter 12 distributes the signals received by the antenna 11 to the ranging signal reception unit 13 and the augmentation information reception unit 14. The ranging signal reception unit 13 sends ranging signals to a satellite calculation unit 21 and a first decoding unit 22 out of the signals distributed from the splitter 12. The ranging signal reception unit 13 sends carrier phase φ, pseudorange P, and Doppler D to the first decoding unit 22, and navigation messages to the satellite calculation unit 21. The augmentation information reception unit 14 sends augmentation information to a second decoding unit 23 out of the signals distributed from the splitter 12.

The processor 20 includes the satellite calculation unit 21, the first decoding unit 22, the second decoding unit 23, a satellite correction unit 24, a delay calculation unit 25, the first bias conversion unit 26, the second bias conversion unit 27, the first correction unit 28, the second correction unit 29, and the position calculation unit 29a. These functional components are implemented by a program. The program is stored in the auxiliary storage device 40. The functions of the respective components will be described later in Description of operation. The first bias conversion unit 26 and the second bias conversion unit 27 are the conversion unit. The first correction unit 28 and the second correction unit 29 are a correction unit.

The auxiliary storage device 40 stores the conversion table 41 and various types of data, not shown. The processor 20 loads data in the auxiliary storage device 40 into the main storage device 30 and reads the data from the main storage device 30.

The GNSS reception unit 10 receives navigation messages, augmentation information, carrier phase, pseudorange, and Doppler. It receives transmission signals transmitted by positioning satellites. Transmission signals from the GPS satellite 311 and the Galileo satellite 312 include navigation messages and ranging signals. Transmission signals from the quasi-zenith satellite 313 include augmentation information as well as navigation messages and ranging signals. A ranging signal contains carrier phase, pseudorange, and Doppler.

Description of Operation

Figure 6:
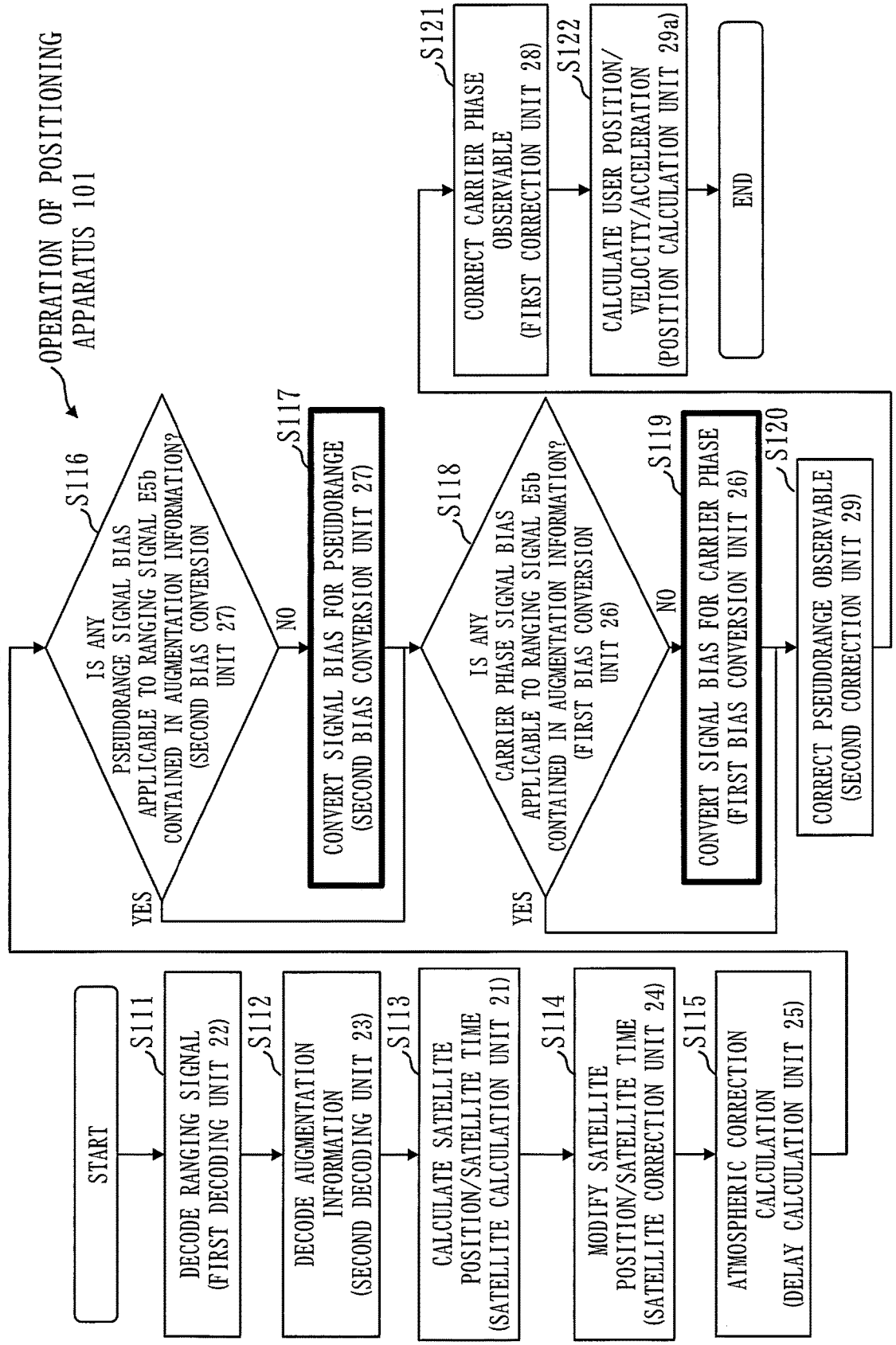
FIG. 6 is a diagram of Embodiment 1 and is a flowchart illustrating an operation of the positioning apparatus 101.

FIG. 6 is a flowchart illustrating the operation of the positioning apparatus 101. Referring to FIG. 6, the operation of the positioning apparatus 101 is described. The GNSS reception unit 10 receives signals transmitted by the GPS satellite 311, the Galileo satellite 312, and the quasi-zenith satellite 313 via the antenna 11. The splitter 12 distributes signals received from the satellites. The splitter 12 sends ranging signals from the GPS satellite 311, the Galileo satellite 312, and the quasi-zenith satellite 313 to the ranging signal reception unit 13, and augmentation information received from the quasi-zenith satellite 313 to the augmentation information reception unit 14. The ranging signal reception unit 13 sends the carrier phase, the pseudorange, and Doppler contained in ranging signals to the first decoding unit 22. The augmentation information reception unit 14 sends augmentation information to the satellite correction unit 24, the delay calculation unit 25, the first bias conversion unit 26, and the second bias conversion unit 27.

<Step S111>

At step S111, the first decoding unit 22 decodes a ranging signal. The first decoding unit 22 decodes the ranging signal and sends the pseudorange P to the second correction unit 29, the carrier phase φ to the first correction unit 28, and Doppler shift to the position calculation unit 29a.

<Step S112>

At step S112, the second decoding unit 23 decodes augmentation information. The second decoding unit 23 sends satellite position error δo and satellite clock error δt to the satellite correction unit 24, tropospheric delay T and ionospheric delay I to the delay calculation unit 25, the signal bias CB related to the pseudorange to the second bias conversion unit 27, and the signal bias PB related to the carrier phase to the first bias conversion unit 26.

<Step S113>

At step S113, the satellite calculation unit 21 calculates the satellite position and satellite time of the positioning satellite from a navigation message.

<Step S114>

At step S114, the satellite correction unit 24 performs correction of the satellite position and correction of the satellite time. The satellite correction unit 24 corrects the satellite position and satellite time determined by the satellite calculation unit 21 using error information related to the position and time of the GNSS satellite contained in augmentation information, and sends the corrected satellite position and satellite time to the position calculation unit 29a.

<Step S115>

At step S115, the delay calculation unit 25 performs calculation for atmospheric correction. The delay calculation unit 25 calculates a tropospheric delay amount and an ionospheric delay amount at the positioning location of the positioning apparatus 101 from quantities of state of the troposphere and the ionosphere contained in the augmentation information. For the ionospheric delay amount, the ionospheric delay amount is converted to a value of the frequency of signals used by the positioning apparatus 101 because the delay amount differs from frequency to frequency. The delay calculation unit 25 sends calculated tropospheric delay amount $d_{trop}$ and ionospheric delay amount $d_{ion}$ to the first correction unit 28 and the second correction unit 29.

<Step S116>

At step S116, the second bias conversion unit 27 determines whether any pseudorange signal bias CB compatible with the frequency of the ranging signal is contained in the augmentation information. If none is contained, the processing moves on to step S117. If one is contained, the processing moves on to step S118.

<Step S117>

At step S117, the second bias conversion unit 27 converts the signal bias CB related to the pseudorange. As mentioned in the description of FIG. 3, when the signal bias related to pseudorange contained in the augmentation information is not compatible with the ranging signal, the second bias conversion unit 27 acquires the conversion value Δp by making a reference 27a to the conversion table 41, and converts the signal bias $CB_i$ related to pseudorange contained in the augmentation information to the pseudorange signal bias $CB_j$ compatible with the ranging signal.

<Step S118: Determination>

At step S118, the first bias conversion unit 26 determines whether any carrier phase signal bias $PB_j$ compatible with the ranging signal is contained in the augmentation information. If none is contained, the processing moves on to step S119. If one is contained, the processing moves on to step S120.

<Step S9>
<Step S119>

At step S119, the first bias conversion unit 26 converts the carrier phase signal bias $PB_i$ to the carrier phase signal bias $PB_j$. That is, the first bias conversion unit 26 converts the carrier phase signal bias $PB_i$ contained in augmentation information to the carrier phase signal bias $PB_j$ by using expression (1), as mentioned in the description of FIG. 3.

<Step S120>

At step S120, the second correction unit 29 corrects a pseudorange observable using expression (12) below. That is, the second correction unit 29 corrects a pseudorange observable $P_j$ using the tropospheric delay amount $d_{trop}$ and the ionospheric delay amount $d_{ion,j}$ computed by the delay calculation unit 25 and the converted pseudorange signal bias $CB_j$.

FORMULA 6

$$\hat{P}_j = P_j - (d_{trop} + d_{ion,j} + \overline{CB_j}) \quad (12)$$

$P_j$: pseudorange observable for frequency fj [m]
$\hat{P}_j$: corrected pseudorange observable for frequency fj [m]
$d_{trop}$: tropospheric delay amount [m]
$d_{ion,j}$: ionospheric delay amount at frequency fj [m]
$\overline{CB_j}$: pseudorange signal bias at frequency fj [m]

<Step S121>

At step S121, the first correction unit 28 corrects a carrier phase observable using expression (13) below. The first correction unit 28 corrects a carrier phase observable $\varphi_j$ using the tropospheric delay amount $d_{trop}$ and the ionospheric delay amount $d_{ion,j}$ computed by the delay calculation unit 25 and the converted carrier phase signal bias $PB_j$.

FORMULA 7

$$\hat{\phi}_j = \phi_j - (d_{trop} - d_{ion,j} + \overline{PB_j}) \quad (13)$$

$\phi_j$: carrier phase observable for frequency fj [m]
$\hat{\phi}_j$: corrected carrier phase observable for frequency fj [m]
$\overline{PB_j}$: carrier phase signal bias at frequency fj [m]

<Step S122>

At step S122, the position calculation unit 29a calculates the position, velocity, and acceleration of the positioning apparatus 101 using expressions (14) to (16) below. The position calculation unit 29a determines quantities of state with the Kalman filter or the least squares method based on the observation equations of expressions (14) to (16), with the quantities of state being the "position, velocity, and acceleration of the positioning apparatus 101" and an integer value bias $N_j$, and the observable being the "pseudorange amount, carrier phase, and Doppler shift after correction".

FORMULA 8

$$\hat{P}_j = |s(t-T) - r(t)| + c \times (dt(t) - dT(t-T)) + d_{ant} \quad (14)$$

$$\hat{\phi}_j = |s(t-T) - r(t)| + c \times (dt(t) - dT(t-T)) + \lambda_j \times N_j + d_{ant} + d_{wup} \quad (15)$$

$$D_j = |\dot{s}(t-T) - \dot{r}(t)| + c \times (d\dot{t}(t) - d\dot{T}(t-T)) \quad (16)$$

$\hat{P}_j$: corrected pseudorange observable for frequency fj [m]
$\hat{\phi}_j$: corrected carrier phase observable for frequency fj [m]
s: GNSS satellite position vector corrected with a navigation message and augmentation signal [m]
r: receiver position vector [m]
T: propagation time [s]
dT: satellite clock error calculated from a navigation message and augmentation information [s]
dt: receiver clock error [s]
$d_{ant}$: receiver antenna phase offset and antenna phase center variation [m]
$\lambda_j$: wavelength of frequency fj [m]
$N_j$: integer bias for frequency fj [cycle]
$d_{wup}$: phase windup [m]
$D_j$: Doppler shift observable for frequency $f_j$ [m/s]
$\dot{s}$: GNSS satellite velocity vector [m/s]
$\dot{r}$: receiver velocity vector [m/s]
$\ddot{dt}$: rate of change in receiver clock error [–]
$\ddot{dT}$: rate of change in satellite clock error [–]

Effect of Embodiment 1

Figure 7:
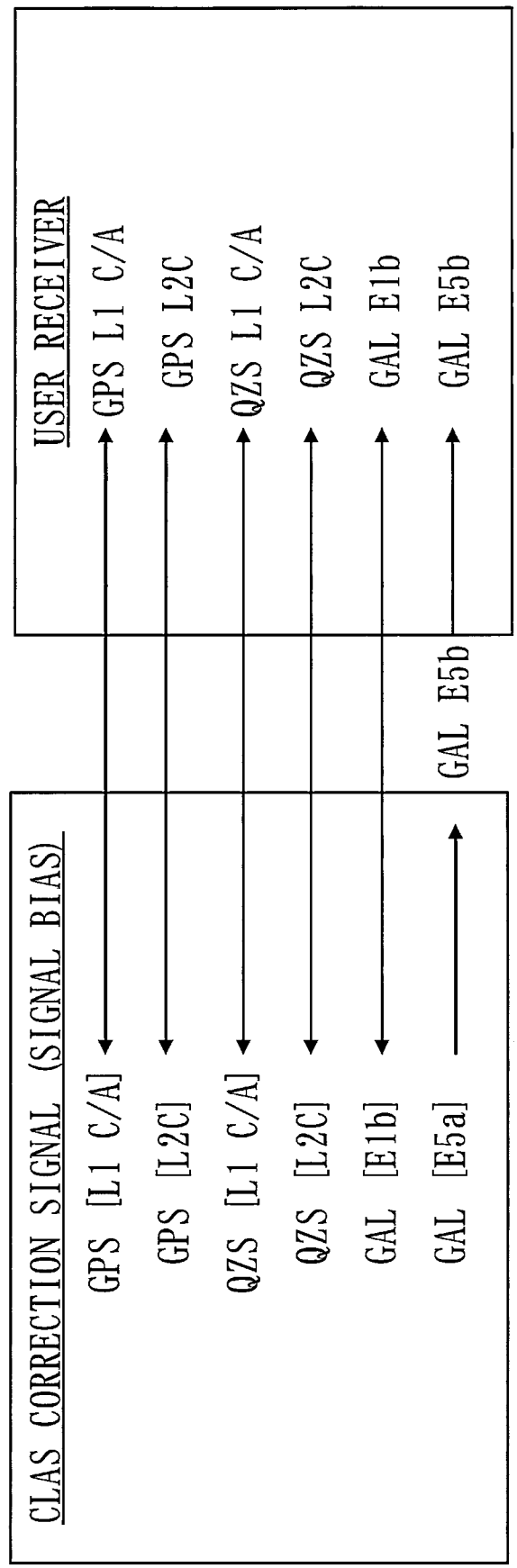
FIG. 7 is a diagram of Embodiment 1 showing an example of applying the positioning apparatus 101 to PPP-RTK positioning that uses augmentation information for CLAS.

FIG. 7 shows an example of applying the positioning apparatus 101 to PPP-RTK positioning that uses augmentation information of CLAS (Centimeter Level Augmentation Service). In the following description, GPS indicates the GPS satellite 311, Galileo indicates the Galileo satellite 312, and QZS indicates the quasi-zenith satellite 313. The CLAS is a service that distributes error information related to satellite orbit error, satellite clock error, satellite signal bias, tropospheric delay, and ionospheric delay to positioning users. The satellite signal bias includes error information related to L1C/A, L2P, L2C, and L5 of the GPS, QZS L1C/A, L2C, and L5, and Galileo E1b and E5a. On the positioning apparatus 101 of the user, ranging signals for GPS L1C/A and L2C, QZS L1C/A and L2C, and Galileo E1b and E5b can be received. Thus, with a conventional positioning apparatus, correction of errors contained in a ranging signal is possible for GPS L1C/A and L2C, QZS L1C/A and L2C, and Galileo E1b among the signals that can be received by the user's positioning terminal, w % bile positioning by two frequencies has not been feasible with Galileo E5b. The positioning apparatus 101 is able to convert a satellite signal bias related to Galileo E5a of the CLAS to a signal bias for Galileo E5b through a conversion scheme of pseudorange signal bias and a conversion scheme of signal bias related to the carrier phase. Thus, the positioning apparatus 101 of the user can also utilize ranging signals for Galileo E5b in positioning computation.

Figure 8:
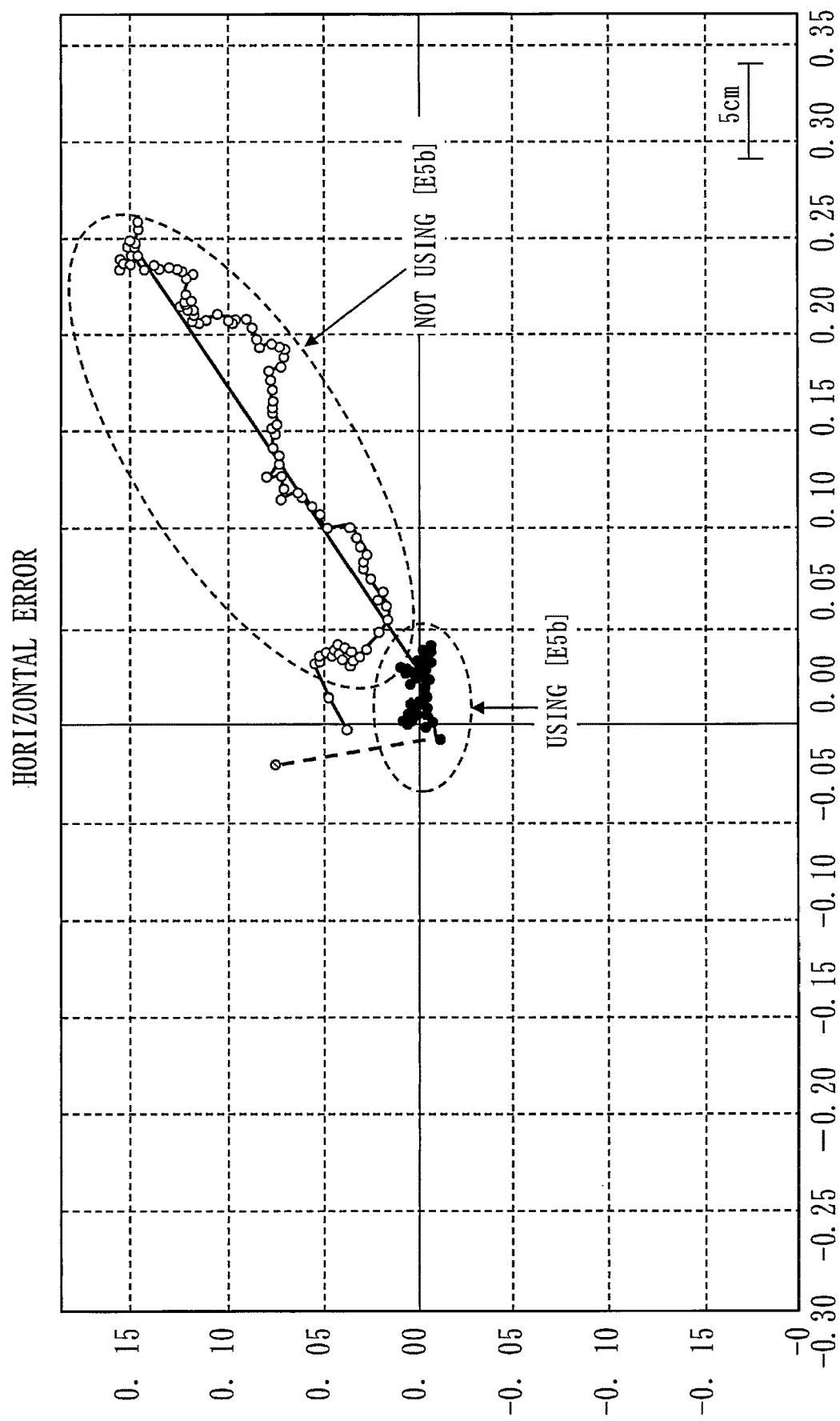
FIG. 8 is a diagram of Embodiment 1 illustrating an effect of using augmentation information [E5b].

FIG. 8 illustrates an effect of using the augmentation information [E5b]. As the positioning apparatus 101 converts the error information [E5a] of ranging signal E5a to the error information [E5b] usable with the ranging signal E5b, the error information can be used for each of the six kinds of ranging signals. Consequently, as shown in FIG. 8, positioning errors is decrease when error information is used for each of the six kinds of ranging signals by making use of converted error information. The length of a side of a broken-line cell represents an error of 5 cm. The left side on the horizontal axis indicates west and the right side indicates east, and the upper side on the vertical axis indicates north and the lower side indicates south.

As the number of ranging signals available for positioning computation increases, the accuracy of a float solution improves. Further, since an integer value bias can be turned into an integer, further improvement in positioning accuracy and shortening of initial convergence time become possible.

FIG. 9 shows an example of pieces of error information that can be converted mutually. In FIG. 9, Galileo, BeiDou, GLONASS, and GPS are illustrated as GNSS. Galileo [E5a] and Galileo [E5b] can be converted. Galileo [E5b] and Galileo [E5altboc] can be converted. Further, BeiDou [B11] and BeiDou [B1C] can be converted.

As described above, the positioning apparatus 101 is a positioning apparatus to process a first ranging signal having a first frequency and a second ranging signal having a second frequency which are transmitted from a plurality of positioning satellites.

As described above, the first augmentation information, like the signal bias $CB_i$ related to pseudorange and the signal bias $PB_i$ related to carrier phase, is transmitted from one positioning satellite of a plurality of positioning satellites. In the description above, the one positioning satellite is the quasi-zenith satellite 313. The first augmentation information is provided in a state space representation from the quasi-zenith satellite 313.

Note that the first augmentation information, like the signal bias $CB_i$ related to pseudorange and the signal bias $PB_i$ related to carrier phase, may also be transmitted from a public line such as the Internet. The first augmentation information is provided in a state space representation.

The first augmentation information is obtained from outside. As an example of the outside, the first augmentation information is obtained from a transmission device that transmits positioning augmentation information including the first augmentation information. The transmission device can be a device like the quasi-zenith satellite 313 or an augmentation information generation apparatus 200, discussed later in Embodiment 3.

The first augmentation information is dependent on the first frequency, and the conversion unit converts the first augmentation information to the second augmentation information so as to match the second frequency. In Embodiment 1, the signal bias $CB_i$ and the signal bias $PB_i$ as the first augmentation information are dependent on the "frequency of the ranging signal E5a of the Galileo satellite 312", or the first frequency. The conversion unit converts the first augmentation information to the second augmentation information so that the first augmentation information matches the "frequency of the ranging signal E5b of the Galileo satellite 312", or the second frequency. The second augmentation signal is the signal bias $CB_j$ and the signal bias $PB_j$.

Embodiment 2

Figure 10:
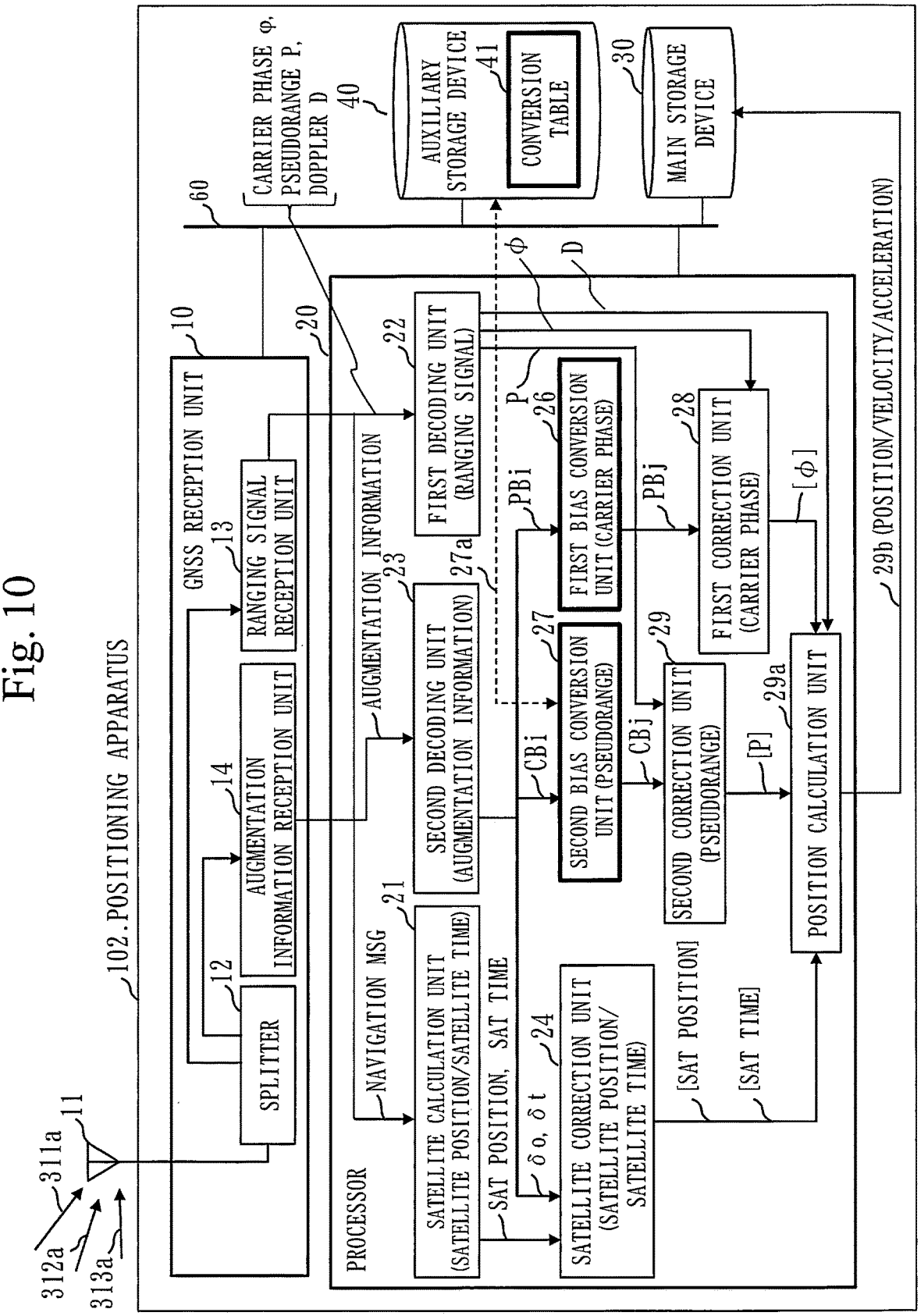
FIG. 10 is a diagram of Embodiment 2 and is a hardware configuration diagram of a positioning apparatus 102.
Figure 11:
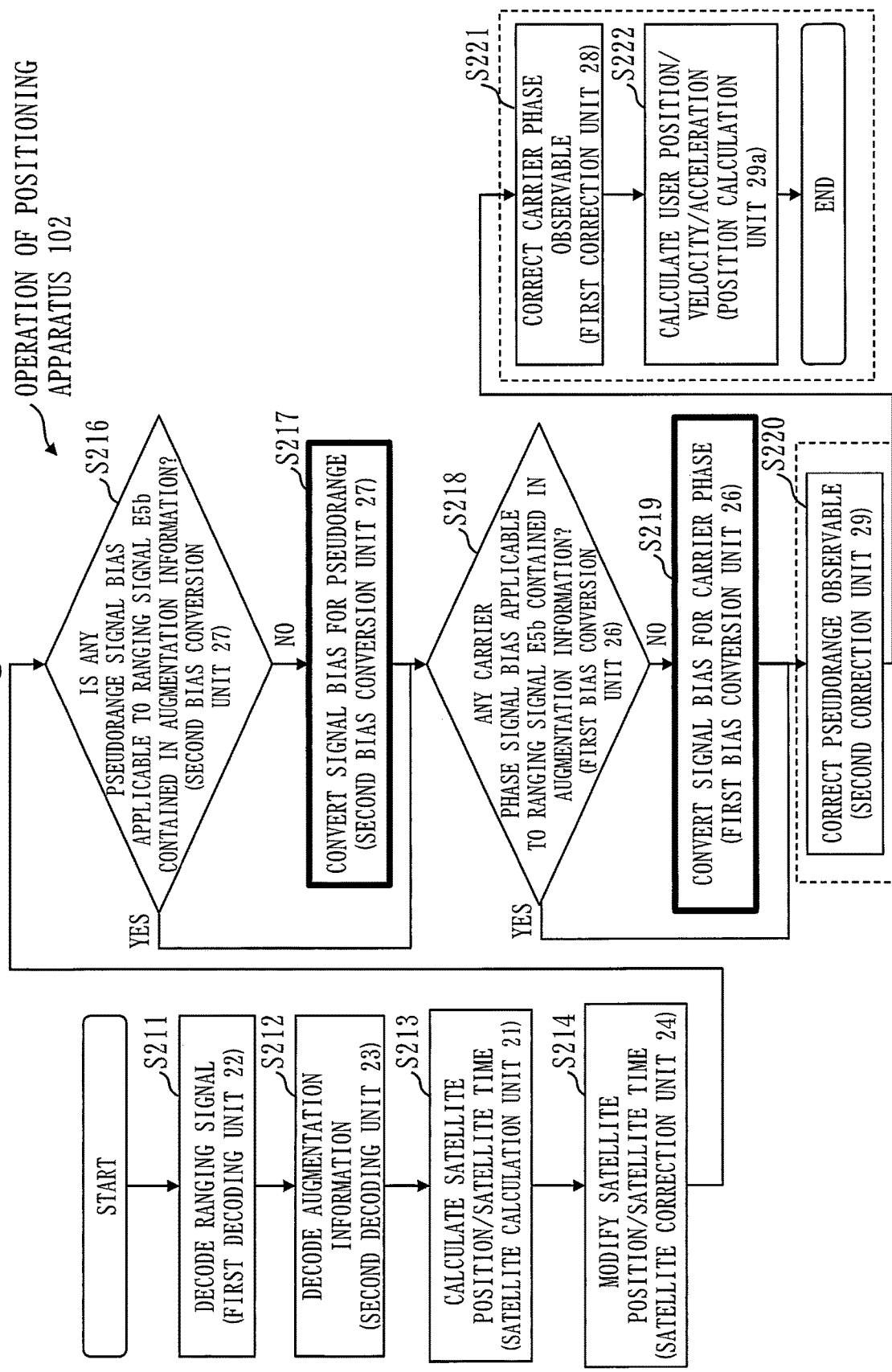
FIG. 11 is a diagram of Embodiment 2 and is a flowchart illustrating the operation of the positioning apparatus 102.

Referring to FIGS. 10 and 11, a positioning apparatus 102 in Embodiment 2 is described. The positioning apparatus 102 is a device that performs positioning by the PPP-AR positioning approach.

FIG. 10 is a hardware configuration diagram of the positioning apparatus 102.

FIG. 11 is a flowchart illustrating the operation of the positioning apparatus 102.

Since in the PPP-AR no augmentation information related to atmospheric delay amount is included, the position calculation unit 29a performs model correction of the atmospheric delay amount or estimates the atmospheric delay amount along with user position. Thus, the delay calculation unit 25 is not present in the positioning apparatus 102. Additionally, in the positioning apparatus 102, processing at the second correction unit 29, the first correction unit 28, and the position calculation unit 29a is different.

Steps S211 to S222 correspond to steps S111 to S122. In Embodiment 2, there is no step corresponding to step S115, since for the tropospheric delay and the ionospheric delay, model correction is performed or they are estimated by an estimation filter along with user position.

Specifically, step S111 corresponds to step S211; step S112 corresponds to step S212; step S113 corresponds to step S213; and step S114 corresponds to step S214. Further, step S116 corresponds to step S216; step S117 corresponds to step S217; step S118 corresponds to step S218; step S119 corresponds to step S219; step S120 corresponds to step S220; step S121 corresponds to step S221; and step S122 corresponds to step S222.

As the processing at steps S211 to S214 and steps S216 to S219 is the same as in Embodiment 1, steps S220 to S222 will be described.

<Step S220>

At step S220, the second correction unit 29 corrects a pseudorange observable using expression (17) below. Specifically, the second correction unit 29 corrects an observable $P_j$ of pseudorange using the converted pseudorange signal bias $\overline{CB}_j$.

FORMULA 9

$$\hat{P}_j = P_j - \overline{CB}_j \quad (17)$$

$P_j$: pseudorange observable for frequency fj [m]
$\hat{P}_j$: corrected pseudorange observable for frequency fj [m]
$\overline{CB}_j$: pseudorange signal bias at frequency fj [m]

<Step S221>

At step S221, the first correction unit 28 corrects the observable of the carrier phase using expression (18) below. Specifically, the first correction unit 28 corrects an observable $\varphi_j$ of the carrier phase using the converted carrier phase signal bias $\overline{PB}_j$.

FORMULA 10

$$\hat{\varphi}_j = \varphi_j - \overline{PB}_j \quad (18)$$

$\varphi_j$: carrier phase observable for frequency fj [m]
$\hat{\varphi}_j$: corrected carrier phase observable for frequency fj [m]
$\overline{PB}_j$: carrier phase signal bias at frequency fj [m]

<Step S222>

At step S222, the position calculation unit 29a uses expressions (19) to (21) below to estimate the position, velocity, and acceleration of the positioning apparatus 102 with the Kalman filter or the least squares method. For the tropospheric delay and the ionospheric delay, the position calculation unit 29a performs model correction of the atmospheric delay or estimates the atmospheric delay with an estimation filter along with the user position. The position calculation unit 29a also determines the uncertainty of the carrier phase.

FORMULA 11

$$\hat{P}_j = |s(t-T) - r(t)| + c \times (dt(t) - dT(t-T)) + d_{trop} + d_{ion,j} + d_{ant} \quad (19)$$

$$\hat{\varphi}_j = |s(t-T) - r(t)| + c \times (dt(t) - dT(t-T)) + d_{trop} - d_{ion,j} + \lambda_j \times N_j + d_{ant} + d_{wup} \quad (20)$$

$$D_j = |\dot{s}(t-T) - \dot{r}(t)|(t) + c \times (\dot{dt}(t) - \dot{dT}(t-T)) \quad (21)$$

$\hat{P}_j$: corrected pseudorange observable for frequency fj [m]
$\hat{\varphi}$: corrected carrier phase observable for frequency fj [m]
s: GNSS satellite position vector corrected with a navigation message and augmentation signal [m]
r: receiver position vector [m]
t: signal reception time [s]
T: propagation time [s]
dT: satellite clock error calculated from a navigation message and augmentation information [s]
dt: receiver clock error [s]
$d_{ant}$: receiver antenna phase offset and antenna phase center variation [m]
$\lambda_j$: wavelength of frequency fj [m]
$N_j$: integer bias for frequency fj [cycle]
$d_{wup}$: phase windup [m]
$D_j$: Doppler shift observable for frequency fj [m/s]
$\dot{s}$: GNSS satellite velocity vector [m/s]
$\dot{r}$: receiver velocity vector [m/s]
$\dot{dt}$: rate of change in receiver clock error [-]
$\dot{dT}$: rate of change in satellite clock error [-]
$d_{trop}$: tropospheric delay amount [m]
$d_{ion,j}$: ionospheric delay amount at frequency fj [m]

Effect of Embodiment 2

According to Embodiment 2, the signal bias $CB_i$ related to pseudorange can be converted to the signal bias $CB_j$ related to pseudorange and the signal bias $PB_i$ related to the carrier phase can be converted to the signal bias $PB_j$ related to the carrier phase also for a positioning apparatus that performs positioning by the PPP-AR positioning approach. Thus, the accuracy of positioning by the PPP-AR can be improved.

Embodiment 3

Embodiment 3 describes an augmentation information generation apparatus 200 that generates augmentation information by using the conversion of expression (1), described in FIG. 3, and the conversion of expression (11).

Figure 12:
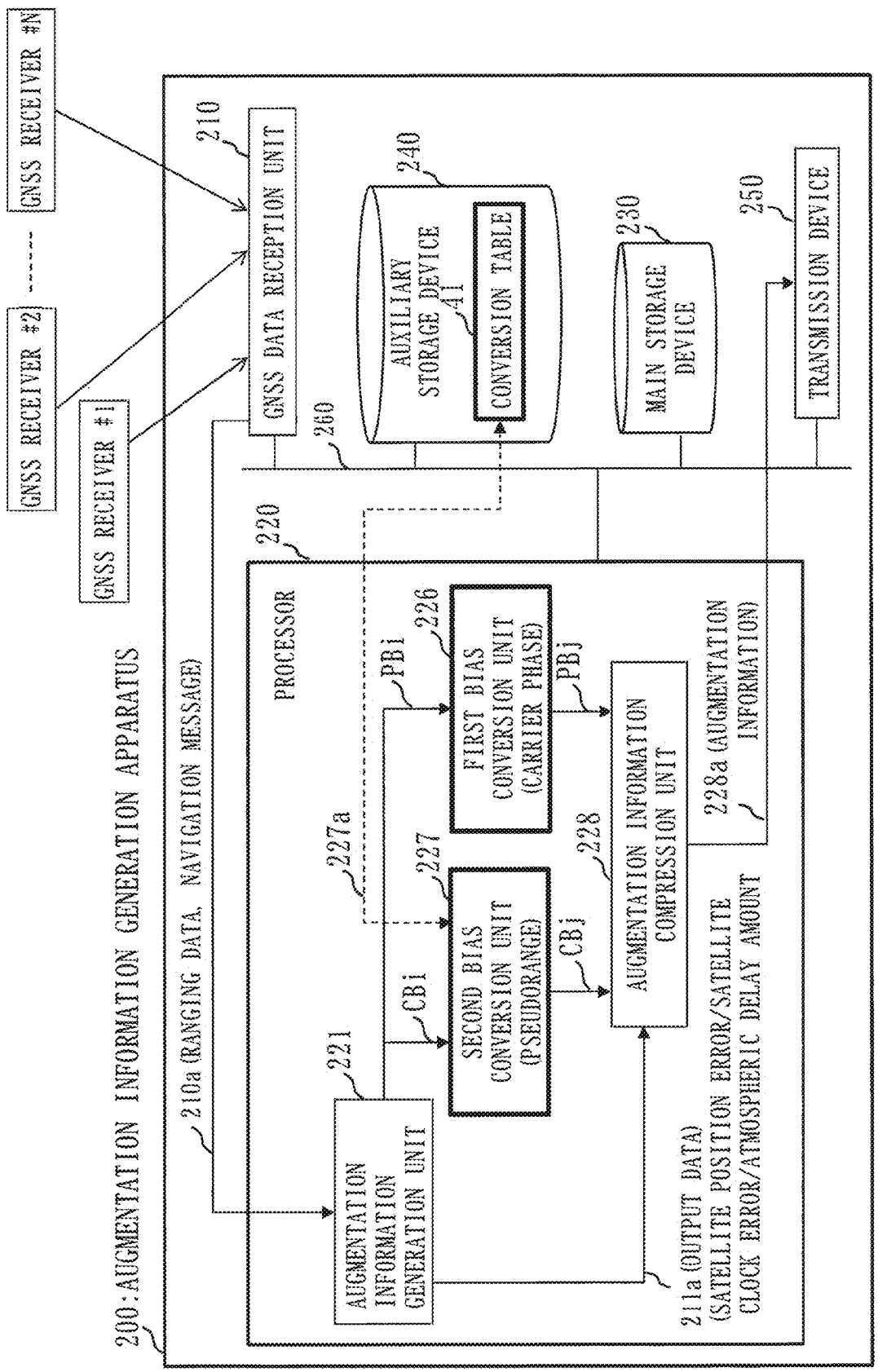
FIG. 12 is a diagram of Embodiment 3 and is a hardware configuration diagram of an augmentation information generation apparatus 200.

FIG. 12 is a hardware configuration diagram of the augmentation information generation apparatus 200.

Figure 13:
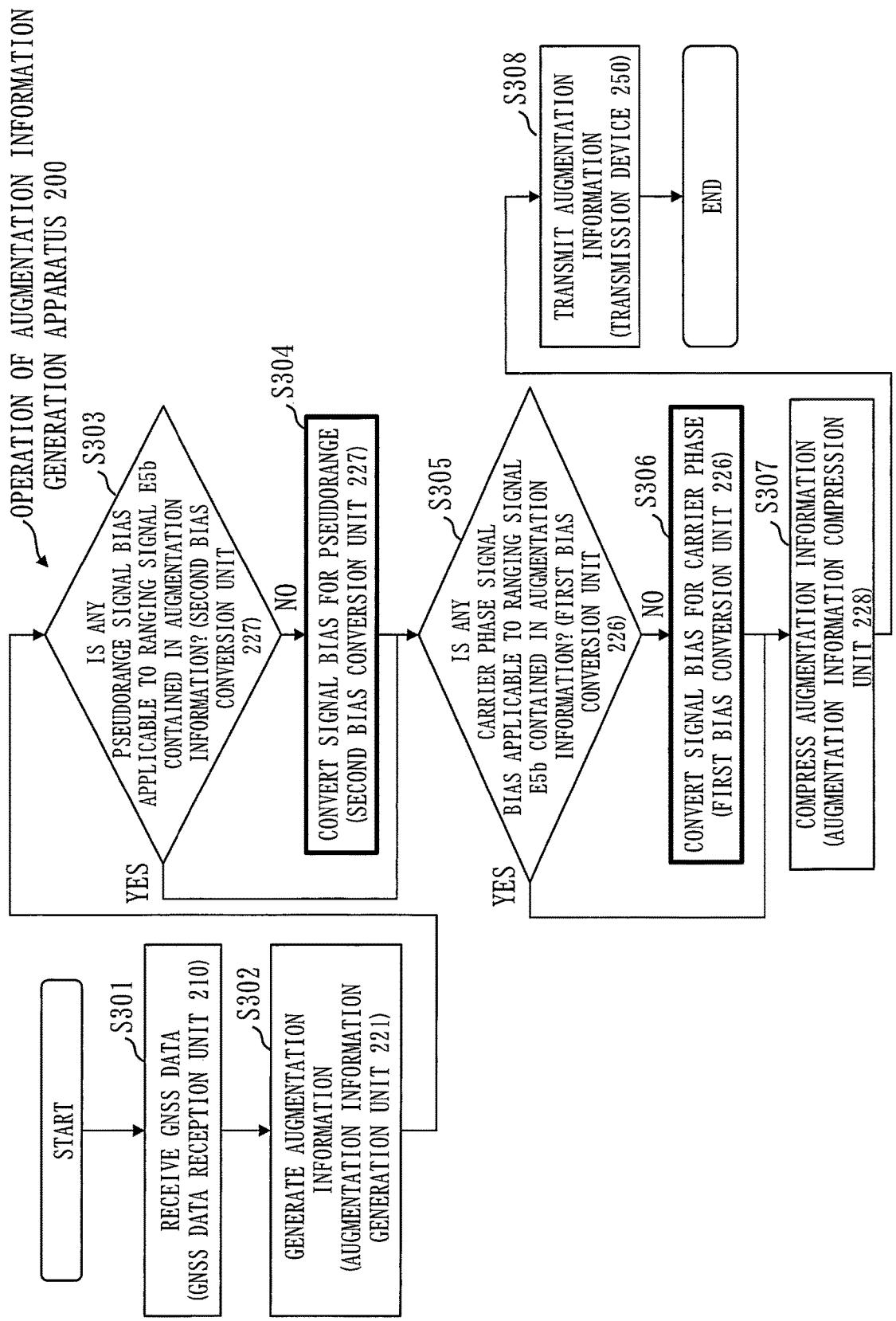
FIG. 13 is a diagram of Embodiment 3 and is a flowchart illustrating the operation of the augmentation information generation apparatus 200.

FIG. 13 is a flowchart illustrating the operation of the augmentation information generation apparatus 200.

A conversion unit of the augmentation information generation apparatus 200 converts, based on the first frequency and the second frequency, augmentation information transmitted from a first positioning satellite for correcting the first calculation information for position calculation, the first calculation information being contained in a first ranging signal having the first frequency, to the second augmentation information for correcting the second calculation information for position calculation, the second calculation information being contained in a second ranging signal having the second frequency transmitted from a positioning satellite.

A first bias conversion unit 226 and a second bias conversion unit 227 form the conversion unit as described later.

The augmentation information generation apparatus 200 includes a GNSS data reception unit 210, a processor 220, a main storage device 230, an auxiliary storage device 240, and a transmission device 250 as hardware.

The GNSS data reception unit 210 receives ranging information and navigation messages from multiple GNSS receivers. The GNSS receivers are fixed in an environment with open surroundings. For example, the GNSS receivers are set at GPS-based control station. The GNSS receivers receive ranging signals and navigation messages for generating augmentation information from positioning satellites and deliver these signals to the augmentation information generation apparatus 200.

The processor 220 includes an augmentation information generation unit 221, a first bias conversion unit 226, a second bias conversion unit 227, and an augmentation information compression unit 228 as functional components.

These functional components are implemented by a program. The program is stored in the auxiliary storage device 240. The function of the first bias conversion unit 226 is the same as the function of the first bias conversion unit 26 in Embodiment 1. The function of the second bias conversion unit 227 is the same as the function of the second bias conversion unit 27 in Embodiment 1. The first bias conversion unit 226 and the second bias conversion unit 227 are the conversion unit. The augmentation information compression unit 228 is a transmission control unit. The transmission control unit provides the first augmentation information in a state space representation by relaying via the quasi-zenith satellite 313.

The auxiliary storage device 240 stores the conversion table 41. Referring to FIG. 13, the operation of the augmentation information generation apparatus 200 is described below.

<Step S301>
At step S301, the GNSS data reception unit 210 receives ranging signals and navigation messages as GNSS data from multiple GNSS data receivers: a GNSS data receiver #1 to a GNSS data receiver #N. The ranging signals include information such as carrier phase, pseudorange, and Doppler.

<Step S302>
At step S302, the augmentation information generation unit 221 calculates augmentation information from the navigation messages and ranging signals received by the GNSS data reception unit 210. This augmentation information is satellite orbit error, satellite clock error, satellite phase bias, ionospheric delay amount, and tropospheric delay amount.

<Step S303>
At step S303, the second bias conversion unit 227 determines whether any pseudorange signal bias $CB_j$ compatible with the ranging signals that are acquired by the positioning user is contained in the augmentation information generated by the augmentation information generation unit 221. If the second bias conversion unit 227 determines none is contained (NO at step S303), the processing moves on to step S304, and if it determines one is contained (YES at step S303), the processing moves on to step S305.

<Step S304>
At step S304, the second bias conversion unit 227 makes a reference 227a to the conversion table 41 and converts the pseudorange signal bias $CB_i$ generated by the augmentation information generation unit 221 to the pseudorange signal bias $CB_j$.

<Step S305>
At step S305, the first bias conversion unit 226 determines whether any carrier phase signal bias $PB_j$ compatible with the ranging signals that are acquired by the positioning user is contained in the augmentation information generated by the augmentation information generation unit 221. If the first bias conversion unit 226 determines none is contained (NO at step S305), the processing moves on to step S306, and if it determines one is contained (YES at step S305), the processing moves on to step S307.

<Step S306>
At step S306, the first bias conversion unit 226 converts the carrier phase signal bias $PB_i$ to the carrier phase signal bias $PB_j$ with $PB_j = F(\lambda_i, \lambda_j, CB_i, PB_i)$ using the pseudorange signal bias $CB_i$ generated by the augmentation information generation unit 221, the values of carrier phase signal bias $PB_i$, $\lambda_i$, and $\lambda_j$, and expression (1).

<Step S307>
At step S307, the augmentation information compression unit 228 compresses the generated augmentation information so as to meet the limitation of line capacity in distribution to the user.

<Step S308>
At step S308, the transmission device 250 distributes the compressed augmentation information to the user via a satellite or a land line.

Description of Effect of Embodiment 3

According to Embodiment 3, the augmentation information generation apparatus 200 converts the signal bias $CB_i$ related to pseudorange to the signal bias $CB_j$ related to pseudorange, converts the signal bias $PB_i$ related to carrier phase to the signal bias $PB_j$ related to carrier phase, and transmits them in augmentation information.

Thus, the user need not have a positioning apparatus with conversion functionality, such as the positioning apparatus 101 or the positioning apparatus 102, which improves the user's convenience.

Embodiment 4

Embodiment 4 is an embodiment in which the signal bias $CB_i$ related to pseudorange is converted to the signal bias $CB_j$ related to pseudorange and the signal bias $PB_i$ related to carrier phase is converted to the signal bias related to the carrier phase $PB_j$ by further using an error value $\Delta I$ of the ionospheric delay amount in addition to the configuration of Embodiment 1 described above.

Accordingly, only differences from Embodiment 1 will be described in the following description and the other arrangements will not be described.

Figure 14:
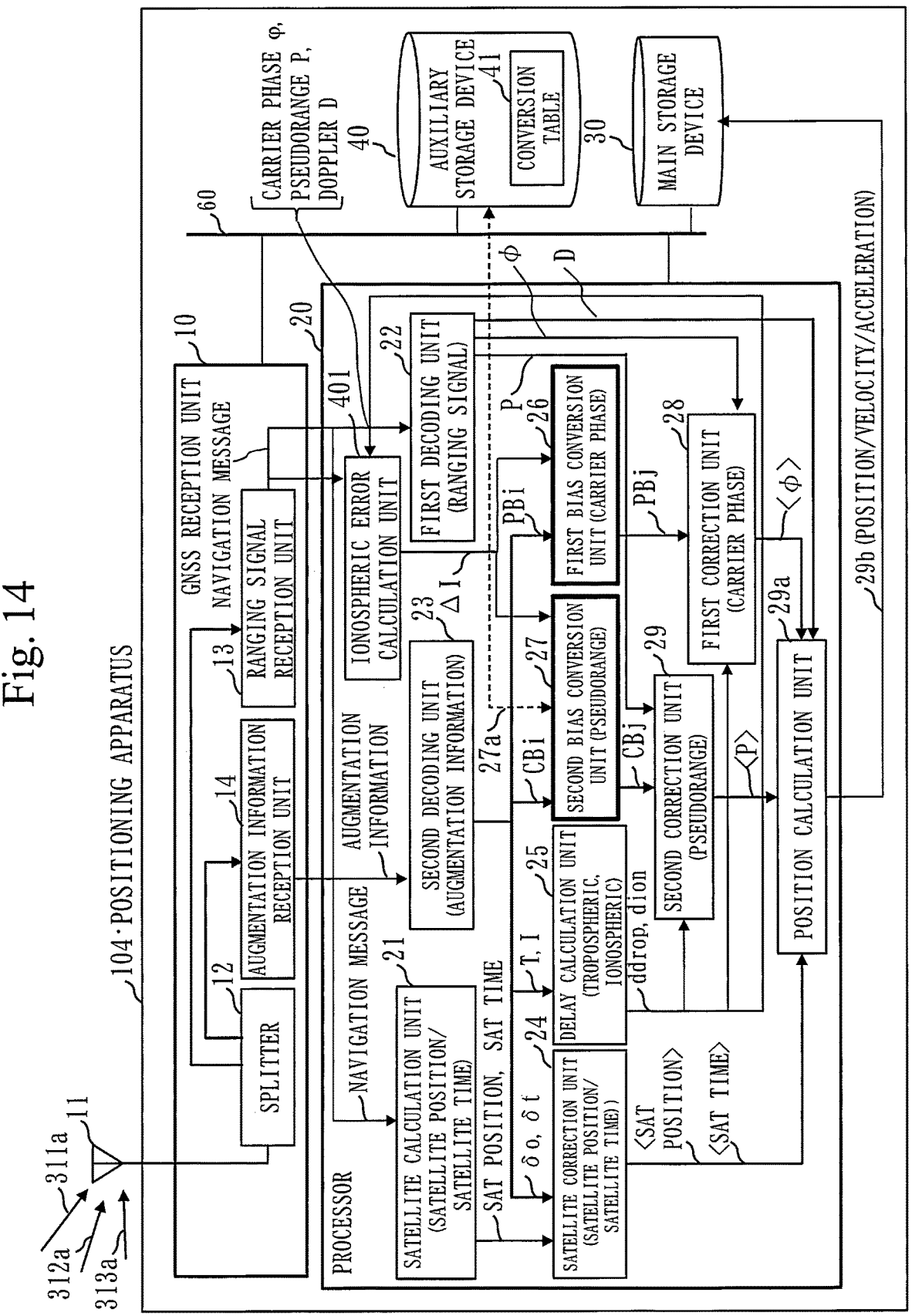
FIG. 14 is a diagram of Embodiment 4 and is a hardware configuration diagram showing a positioning apparatus 104.

FIG. 14 is a block diagram showing a positioning apparatus 104 according to Embodiment 4.

In FIG. 14, the positioning apparatus 104 has an ionospheric error calculation unit 401 to calculate the error $\Delta I$ of the ionospheric delay amount in addition to the configuration of the positioning apparatus 101 described in Embodiment 1.

The ionospheric error calculation unit 401 calculates the error value $\Delta I$ of the ionospheric delay amount, which is the difference between a predicted value of the ionospheric delay amount at the user's positioning location and the value of the ionospheric delay amount calculated by the delay calculation unit 25 from ionospheric delay information contained in augmentation information.

Specifically, the ionospheric error calculation unit 401 uses a Klobuchar model to calculate an ionospheric delay amount error value from ionospheric delay parameters contained in a navigation message acquired at the GNSS reception unit 10.

Alternatively, the ionospheric error calculation unit 401 may calculate the error value $\Delta I$ of the ionospheric delay amount from a geometry-free combination of pseudorange observables, which are the user's ranging signals, calculated at the delay calculation unit 25.

In FIG. 14, the first bias conversion unit 26 and the second bias conversion unit 27 each acquire the error value $\Delta I$ of the ionospheric delay amount from the ionospheric error calculation unit 401 and convert the signal bias related to carrier phase and the signal bias related to pseudorange, respectively. Their respective conversion processes will be described later.

Description of Operation

Figure 15:
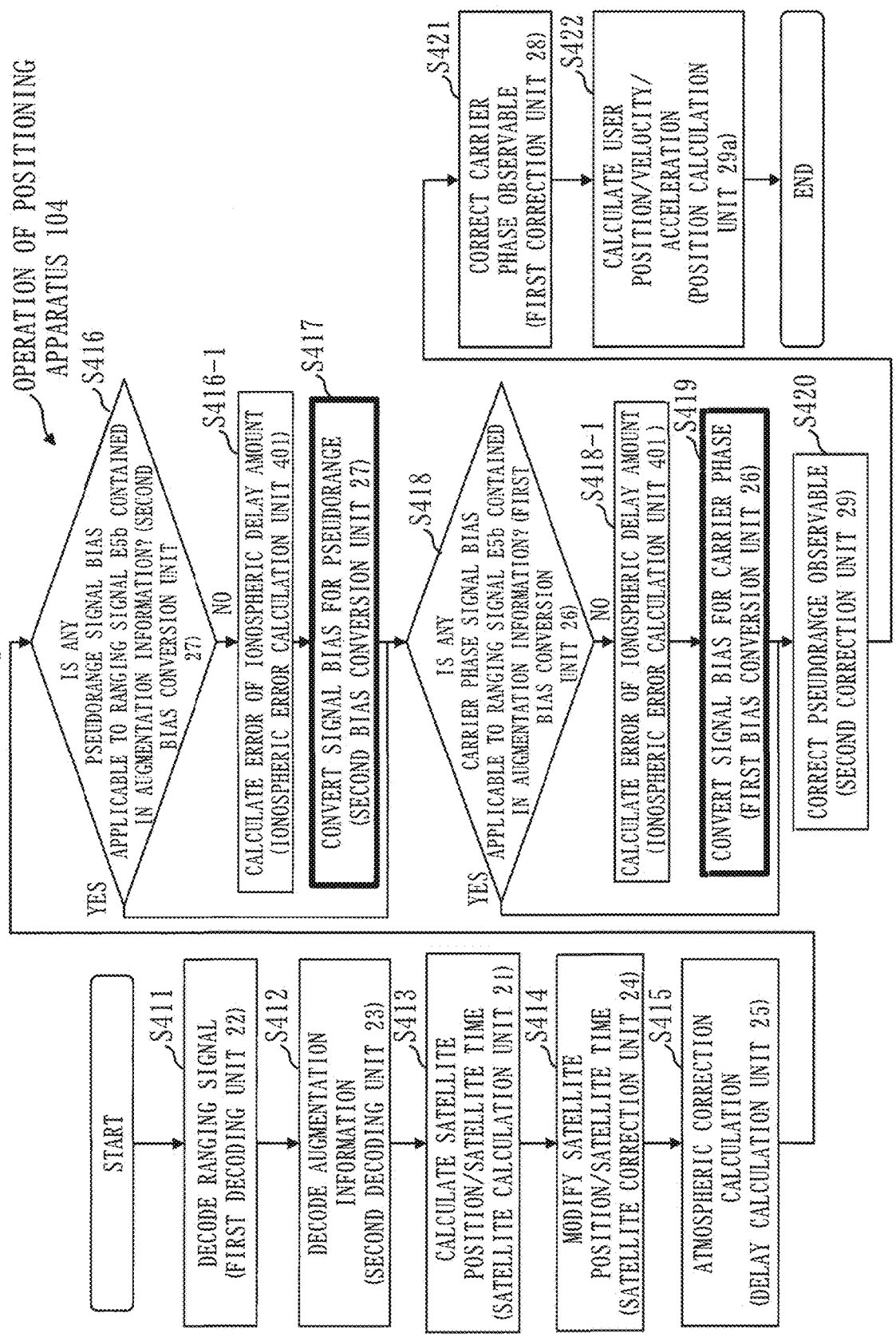
FIG. 15 is a diagram of Embodiment 4 and is a flowchart illustrating the operation of the positioning apparatus 104.

FIG. 15 is a flowchart illustrating the operation of the positioning apparatus 104 according to Embodiment 4.

In FIG. 15, steps S411 to S416, step S417, step S418, and steps S419 to S422 correspond to steps S111 to S122 in FIG. 6 of Embodiment 1.

In FIG. 15, step S416-1 is present between step S416 corresponding to step S116 and step S417 corresponding to step S117, compared to FIG. 6.

In addition, step S418-1 is present between step S418 corresponding to step S118 and step S419 corresponding to step S119.

Thus, regarding FIG. 15, only steps with different processing from FIG. 6 will be described.

As steps S411 to S416 are similar processing to steps S11 to S116, they will not be described.

At step S416-1, the ionospheric error calculation unit 401 calculates the error ΔI of the ionospheric delay amount and outputs the error ΔI of the ionospheric delay amount to the second bias conversion unit 27.

At step S417, the second bias conversion unit 27 performs conversion of the signal bias related to the pseudorange further using the error ΔI of the ionospheric delay amount, compared to step S117 in Embodiment 1.

At step S418-1, the ionospheric error calculation unit 401 calculates the error ΔI of the ionospheric delay amount and outputs the error ΔI of the ionospheric delay amount to the first bias conversion unit 26. If the error ΔI of the ionospheric delay amount was calculated at step S416-1, the ionospheric error calculation unit 401 may use the calculated error ΔI.

At step S419, the first bias conversion unit 26 performs conversion of the signal bias related to the carrier phase further using the error ΔI of the ionospheric delay amount, compared to step S119 in Embodiment 1.

As the contents of processing at steps S420 to S422 are the same as steps S120 to S122, they will not be described.

A conversion process using the error value ΔI of the ionospheric delay amount at the first bias conversion unit 26 and the second bias conversion unit 27 is described below.

The second bias conversion unit 27 converts the signal bias $CB_i$ related to pseudorange to the signal bias $CB_j$ related to pseudorange using expression (22) shown below.

Expression (22) additionally includes a term for the error value ΔI of the ionospheric delay amount, compared to expression (11).

Conversion of pseudorange signal bias
Making reference to the value Δp from the conversion table, the signal bias for frequency fi is converted to that for fj:

FORMULA 12

$$\overline{CB}_j = CB_i + \Delta p + \left(1 - \frac{f_i^2}{f_j^2}\right)\Delta I \quad (22)$$

$CB_i$: pseudorange signal bias for frequency fi [m]
$\overline{CB}_j$: pseudorange signal bias for frequency fj converted from pseudorange signal bias for frequency fi [m]
ΔI: ionospheric delay amount error value (an ionospheric delay amount calculated from augmentation information minus a predicted value) [m]

The first bias conversion unit 26 converts the signal bias $PB_i$ for the carrier phase to the signal bias $PB_j$ for the carrier phase using expression (23) shown below.

Expression (23) additionally includes a term for the error value ΔI of the ionospheric delay amount, compared to expression (1).

Conversion of carrier phase signal bias
From the conversion formula below, conversion of the signal bias for fi to that for fj:

FORMULA 13

$$\overline{PB}_j = \lambda_j \left\{ \left(\frac{1}{\lambda_j} - \frac{1}{\lambda_i}\right) CB_i + \frac{PB_i}{\lambda_i} \right\} + \left(1 - \frac{f_i^2}{f_j^2}\right)\Delta I \quad (23)$$

$PB_i$: carrier phase signal bias for frequency fi [m]
$\overline{PB}_j$: carrier phase signal bias for frequency fj converted from the carrier phase signal bias for frequency fi [m]
$\lambda_i/\lambda_j$: wavelengths of frequencies fi and fj [m]
ΔI: ionospheric delay amount error value (an ionospheric delay amount calculated from augmentation information minus a predicted value) [m]

The way of computing expressions (22) and (23) is shown below.

FORMULA 14

Observation equation $$\begin{cases} P_i = \rho + I_i + \delta P_i \\ P_j = \rho + \frac{f_i^2}{f_j^2} I_i + \delta P_j \\ \varphi_i = \frac{f_i}{c}\rho - \frac{f_i}{c} I_i + N_i + \delta\varphi_i \\ \varphi_j = \frac{f_j}{c}\rho - \frac{f_j}{c}\frac{f_i^2}{f_j^2} I_i + N_j + \delta\varphi_j \end{cases}$$

The observation equation for the case of assuming that an error of ΔI is included in the ionospheric delay amount contained in augmentation information is the following, where $I_i$ is the true value of the ionospheric delay.

FORMULA 15

$$\begin{cases} P_i = \rho + (I_i + \Delta I) + \delta P_i - \Delta I \\ P_j = \rho + \frac{f_i^2}{f_j^2}(I_i + \Delta I) + \delta P_j - \frac{f_i^2}{f_j^2}\Delta I \\ \varphi_i = \frac{f_i}{c}\rho - \frac{f_i}{c}(I_i + \Delta I) + N_i + \delta\varphi_i + \frac{f_i}{c}\Delta I \\ \varphi_j = \frac{f_j}{c}\rho - \frac{f_j}{c}\frac{f_i^2}{f_j^2}(I_i + \Delta I) + N_j + \delta\varphi_j + \frac{f_j}{c}\frac{f_i^2}{f_j^2}\Delta I \end{cases}$$

Let $I'_i$ be an ionospheric delay amount having an error of ΔI and let δP'/δφ' be the pseudorange/carrier phase signal bias at that time.

$$\begin{cases} P_i = \rho + I'_i + \delta P'_i \\ P_j = \rho + \frac{f_i^2}{f_j^2} I'_i + \delta P'_j \\ \varphi_i = \frac{f_i}{c}\rho - \frac{f_i}{c} I'_i + N_i + \delta\varphi'_i \\ \varphi_j = \frac{f_j}{c}\rho - \frac{f_j}{c}\frac{f_i^2}{f_j^2} I'_i + N_j + \delta\varphi'_j \end{cases}$$

The following relationships can be derived:

FORMULA 16

$$\begin{cases} I'_i = I_i + \Delta I \\ \delta P'_i = \delta P_i - \Delta I \\ \delta P'_j = \delta P_j - \dfrac{f_i^2}{f_j^2}\Delta I \\ \delta\varphi'_i = \delta\varphi_i + \dfrac{f_i}{c}\Delta I \\ \delta\varphi'_j = \delta\varphi_j + \dfrac{f_j}{c}\dfrac{f_i^2}{f_j^2}\Delta I \end{cases}$$

Conversion formula of the pseudorange signal bias:

$$\delta P_j - \delta P_i = \delta P'_j + \dfrac{f_i^2}{f_j^2}\Delta I - (\delta P'_i + \Delta I) =$$

$$\delta P'_j - \delta P'_i - \left(1 - \dfrac{f_i^2}{f_j^2}\right)\Delta I = const \Rightarrow \delta P'_j = \delta P'_i + \left(1 - \dfrac{f_i^2}{f_j^2}\right)\Delta I$$

Conversion formula of the carrier phase signal bias:

$$\varphi_j - \delta\varphi_i - \dfrac{f_j - f_i}{c}\delta P_i =$$

$$\delta\varphi'_j - \dfrac{f_j}{c}\dfrac{f_i^2}{f_j^2}\Delta I - \left(\delta\varphi'_i - \dfrac{f_i}{c}\Delta I\right) - \dfrac{f_j - f_i}{c}(\delta P'_i + \Delta I) =$$

$$\delta\varphi'_j - \delta\varphi'_i - \dfrac{f_j - f_i}{c}\delta P'_i - \dfrac{f_j}{c}\left(1 - \dfrac{f_i}{f_j}\right)^2 \Delta I \Rightarrow \delta\varphi'_j =$$

$$\delta\varphi'_i + \dfrac{f_j - f_i}{c}\delta P'_i + \dfrac{f_j}{c}\left(1 - \dfrac{f_i}{f_j}\right)^2 \Delta I$$

Description of Effect of Embodiment 4

Embodiment 4 can improve the accuracy of signal bias conversion to enhance the positioning accuracy since it converts the pseudorange signal bias and the carrier phase signal bias by using the error value ΔI of the ionospheric delay amount based on the foregoing configuration and operation.

Embodiment 5

As Embodiment 5, the hardware configurations of the positioning apparatus 101 of FIG. 5, the positioning apparatus 102 of FIG. 10, the positioning apparatus 104 of FIG. 14, and the augmentation information generation apparatus 200 of FIG. 12 are supplementarily described.

<Hardware Configuration of Positioning Apparatus>

The hardware configuration of the positioning apparatus is described first. In the positioning apparatuses of FIGS. 5, 10, and 14, the functions of the satellite calculation unit 21, the first decoding unit 22, the second decoding unit 23, the satellite correction unit 24, the delay calculation unit 25, the first bias conversion unit 26, the second bias conversion unit 27, the first correction unit 28, the second correction unit 29, and the position calculation unit 29a are implemented by a program. However, the functions of the satellite calculation unit 21, the first decoding unit 22, the second decoding unit 23, the satellite correction unit 24, the delay calculation unit 25, the first bias conversion unit 26, the second bias conversion unit 27, the first correction unit 28, the second correction unit 29, and the position calculation unit 29a may be implemented by hardware.

Figure 16:
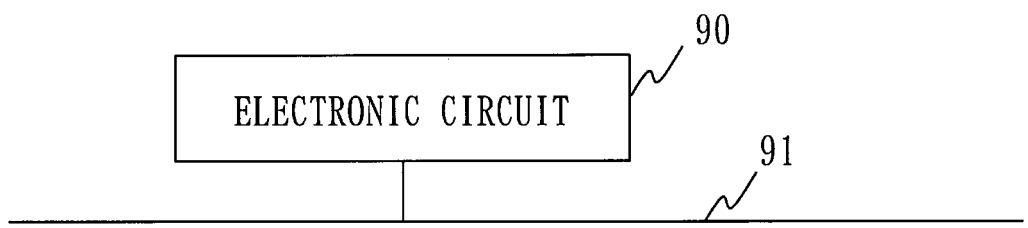
FIG. 16 is a diagram of Embodiment 5 supplementarily showing a hardware configuration of the positioning apparatus.

FIG. 16 shows a configuration in which the functions of the positioning apparatus are implemented by hardware. An electronic circuit 90 of FIG. 16 is a dedicated electronic circuit to implement the functions of the satellite calculation unit 21, the first decoding unit 22, the second decoding unit 23, the satellite correction unit 24, the delay calculation unit 25, the first bias conversion unit 26, the second bias conversion unit 27, the first correction unit 28, the second correction unit 29, and the position calculation unit 29a of the positioning apparatus. The electronic circuit 90 is connected with a signal line 91. The electronic circuit 90 is specifically a single circuit, a composite circuit, a programmed processor, a parallel programmed processor, a logic IC, a GA, an ASIC, or a FPGA. GA is an abbreviation of Gate Array. ASIC is an abbreviation of Application Specific Integrated Circuit. FPGA is an abbreviation of Field-Programmable Gate Array.

The functions of the components of the positioning apparatus may be implemented in one electronic circuit or distributed across a plurality of electronic circuits. Some functions of the functional components of the positioning apparatus may be implemented by an electronic circuit and the remaining functions may be implemented by software.

The respective functions of the satellite calculation unit 21, the first decoding unit 22, the second decoding unit 23, the satellite correction unit 24, the delay calculation unit 25, the first bias conversion unit 26, the second bias conversion unit 27, the first correction unit 28, the second correction unit 29, and the position calculation unit 29a of the positioning apparatus may be implemented by circuitry. For the positioning apparatus, a "unit" may be read as "circuit" or "step" or "procedure" or "process" or "circuitry".

<Hardware Configuration of Augmentation Information Generation Apparatus 200>

In the augmentation information generation apparatus 200 of FIG. 12, the functions of the augmentation information generation unit 221, the first bias conversion unit 226, the second bias conversion unit 227, and the augmentation information compression unit 228 are implemented by a program. However, the functions of the augmentation information generation unit 221, the first bias conversion unit 226, the second bias conversion unit 227, and the augmentation information compression unit 228 of the augmentation information generation apparatus 200 may be implemented by hardware, as with the positioning apparatus. That is, the augmentation information generation apparatus 200 may also be implemented by the electronic circuit 90 shown in FIG. 16, as with the positioning apparatus. Likewise, the functions of the augmentation information generation unit 221, the first bias conversion unit 226, the second bias conversion unit 227, and the augmentation information compression unit 228 of the augmentation information generation apparatus 200 may be implemented by circuitry. For the augmentation information generation apparatus 200, a "unit" may be read as "circuit" or "step" or "procedure" or "process" or "circuitry".

An operation procedure of the positioning apparatus corresponds to a positioning method. A program to implement the operation of the positioning apparatus corresponds to a positioning program. The positioning program may be provided stored on a computer-readable recording medium or provided as a program product.

An operation procedure of the augmentation information generation apparatus 200 corresponds to an augmentation information generation method. A program to implement the operation of the augmentation information generation apparatus 200 corresponds to an augmentation information generation program. The augmentation information generation program may be provided stored on a computer-readable recording medium or provided as a program product.

REFERENCE SIGNS LIST

10: GNSS reception unit; 11: antenna; 12: splitter; 13: ranging signal reception unit; 14: augmentation information reception unit; 20: processor; 21: satellite calculation unit; 22: first decoding unit; 23: second decoding unit; 24: satellite correction unit; 25: delay calculation unit; 26: first bias conversion unit; 27: second bias conversion unit; 27a: reference; 28: first correction unit; 29: second correction unit; 29a: position calculation unit; 29b: output information; 30: main storage device; 40: auxiliary storage device; 41: conversion table; 60: signal line; 90: electronic circuit; 91: signal line; 101, 102, 104: positioning apparatus; 200: augmentation information generation apparatus; 210: GNSS data reception unit; 220: processor; 221: augmentation information generation unit; 226: first bias conversion unit; 227: second bias conversion unit; 227a: reference; 228: augmentation information compression unit; 228a: augmentation information; 230: main storage device; 240: auxiliary storage device; 250: transmission device; 260: signal line; 311: GPS satellite; 312: Galileo satellite; 313: quasi-zenith satellite; 311a, 312a, 313a: transmission signal; 401: ionospheric error calculation unit

The invention claimed is:

1. A positioning apparatus to process a first ranging signal having a first frequency and a second ranging signal having a second frequency which are transmitted from a plurality of positioning satellites, the positioning apparatus comprising:
   processing circuitry to:
      convert first augmentation information for correcting first calculation information for position calculation contained in the first ranging signal to second augmentation information for correcting second calculation information for position calculation contained in the second ranging signal; and
      correct the second calculation information using the second augmentation information;
   wherein
   the first calculation information is a carrier phase contained in the first ranging signal,
   the second calculation information is a carrier phase contained in the second ranging signal,
   the first augmentation information is a signal bias for correcting the carrier phase contained in the first ranging signal,
   the second augmentation information is a signal bias for correcting the carrier phase contained in the second ranging signal, and
   the processing circuitry converts the first augmentation information to the second augmentation information based on an expression of linear combination of the signal bias as the first augmentation information for the carrier phase contained in the first ranging signal and a signal bias related to a pseudorange, the signal bias related to the pseudorange being information for correcting the pseudorange contained in the first ranging signal.

2. The positioning apparatus according to claim 1, wherein
   the first calculation information is the pseudorange contained in the first ranging signal,
   the second calculation information is a pseudorange contained in the second ranging signal,
   the first augmentation information is a signal bias for correcting the pseudorange contained in the first ranging signal, and
   the second augmentation information is a signal bias for correcting the pseudorange contained in the second ranging signal.

3. The positioning apparatus according to claim 2, wherein
   the processing circuitry converts the first augmentation information to the second augmentation information by making reference to conversion information indicating values for use in conversion to the second augmentation information.

4. The positioning apparatus according to claim 1, wherein
   the first augmentation information is transmitted from one positioning satellite of the plurality of positioning satellites.

5. The positioning apparatus according to claim 1, wherein
   the first augmentation information is transmitted from a public line.

6. The positioning apparatus according to claim 1, wherein
   the first augmentation information is provided in a state space representation.

7. The positioning apparatus according to claim 1, wherein
   the first augmentation information is provided in a state space representation from a quasi-zenith satellite.

8. The positioning apparatus according to claim 1, wherein
   the first augmentation information is obtained from outside.

9. The positioning apparatus according to claim 8, wherein
   the first augmentation information is obtained from a transmission device that transmits positioning augmentation information including the first augmentation information.

10. The positioning apparatus according to claim 1, wherein
    the first augmentation information is dependent on the first frequency, and
    the processing circuitry converts the first augmentation information to the second augmentation information so as to match the second frequency.

11. An augmentation information generation apparatus comprising:
    processing circuitry to:
       convert, based on a first frequency and a second frequency, first augmentation information for correcting first calculation information for position calculation, the first calculation information being contained in a first ranging signal having the first frequency transmitted from a positioning satellite, to second augmentation information for correcting second calculation information for position calculation, the second calculation information being contained in a second ranging signal having the second frequency transmitted from a positioning satellite; and transmit the second augmentation information;
wherein
the first calculation information is a carrier phase contained in the first ranging signal,
the second calculation information is a carrier phase contained in the second ranging signal,
the first augmentation information is a signal bias for correcting the carrier phase contained in the first ranging signal,
the second augmentation information is a signal bias for correcting the carrier phase contained in the second ranging signal, and
the processing circuitry converts the first augmentation information to the second augmentation information based on an expression of linear combination of the signal bias as the first augmentation information for the carrier phase contained in the first ranging signal and a signal bias related to a pseudorange, the signal bias related to the pseudorange being information for correcting the pseudorange contained in the first ranging signal.

12. The augmentation information generation apparatus according to claim 11, wherein
the first calculation information is the pseudorange contained in the first ranging signal,
the second calculation information is a pseudorange contained in the second ranging signal,
the first augmentation information is a signal bias for correcting the pseudorange contained in the first ranging signal, and
the second augmentation information is a signal bias for correcting the pseudorange contained in the second ranging signal.

13. The augmentation information generation apparatus according to claim 12, wherein
the processing circuitry converts the first augmentation information to the second augmentation information by making reference to conversion information indicating values for use in conversion to the second augmentation information.

14. The augmentation information generation apparatus according to claim 11, wherein
the processing circuitry provides the first augmentation information in a state space representation by relaying via a quasi-zenith satellite.

* * * * *